United States Patent
Geboff et al.

(10) Patent No.: US 9,848,069 B2
(45) Date of Patent: Dec. 19, 2017

(54) DEVICE SYNCHRONIZATION OVER BLUETOOTH

(71) Applicant: Apple Inc., Cupertino, CA (US)

(72) Inventors: Adam Geboff, Mountain View, CA (US); Sriram Hariharan, San Jose, CA (US); Joakim Linde, Palo Alto, CA (US); Li-Quan Tan, Sunnyvale, CA (US); Shahrooz Shahparnia, Campbell, CA (US)

(73) Assignee: Apple Inc., Cupertino, CA (US)

( * ) Notice: Subject to any disclaimer, the term of this patent is extended or adjusted under 35 U.S.C. 154(b) by 217 days.

(21) Appl. No.: 14/496,314

(22) Filed: Sep. 25, 2014

(65) Prior Publication Data

US 2015/0092642 A1 Apr. 2, 2015

Related U.S. Application Data

(60) Provisional application No. 61/883,381, filed on Sep. 27, 2013.

(51) Int. Cl.
*H04W 4/00* (2009.01)
*H04W 56/00* (2009.01)
(Continued)

(52) U.S. Cl.
CPC .......... *H04L 69/329* (2013.01); *H04L 69/28* (2013.01); *H04W 4/008* (2013.01); *H04W 56/00* (2013.01);
(Continued)

(58) Field of Classification Search
CPC ................................ H04W 4/00; H04W 56/00
See application file for complete search history.

(56) References Cited

U.S. PATENT DOCUMENTS

| | | | |
|---|---|---|---|
| 6,718,395 B1 * | 4/2004 | Ziegler | H04B 1/7156 370/350 |
| 2004/0028023 A1 * | 2/2004 | Mandhyan | G01D 21/00 370/351 |

(Continued)

OTHER PUBLICATIONS

International Search Report and Written Opinion for PCT Application No. PCT/US2014/057366, dated Dec. 26, 2014.

(Continued)

*Primary Examiner* — Xavier Szewai Wong
(74) *Attorney, Agent, or Firm* — Downey Brand LLP

(57) ABSTRACT

Time synchronization between a central wireless communication device and a peripheral wireless communication device is described. Events associated with an application are time stamped at the central wireless communication device, and one or more link layer messages are sent to the peripheral wireless communication device to provide time stamp information to replicate the event timing at the peripheral wireless communication device. A first link layer message includes information about an internal Bluetooth clock to calibrate a corresponding internal clock value at the peripheral wireless communication device. A second link layer message includes information about a current value for the Bluetooth clock and also a value for an offset that provides a time position at a finer granularity than the Bluetooth clock within a timeslot specified by the Bluetooth clock value. Application layer event synchronization between the central and peripheral wireless communication devices allow for power reduced dormant states between events.

19 Claims, 10 Drawing Sheets

(51) Int. Cl.
*H04L 29/08* (2006.01)
*H04L 29/06* (2006.01)
*H04W 52/02* (2009.01)

(52) U.S. Cl.
CPC .......... *H04W 52/0274* (2013.01); *Y02B 60/46* (2013.01); *Y02B 60/50* (2013.01)

(56) References Cited

U.S. PATENT DOCUMENTS

| | | | |
|---|---|---|---|
| 2004/0125822 A1 | 7/2004 | Jun et al. | |
| 2005/0169201 A1* | 8/2005 | Huylebroeck | H04W 74/06 370/311 |
| 2005/0254450 A1* | 11/2005 | Ito | H04B 7/2681 370/328 |
| 2008/0040759 A1* | 2/2008 | She | H04L 29/06027 725/81 |
| 2008/0075126 A1* | 3/2008 | Yang | H04L 67/04 370/509 |
| 2009/0054009 A1* | 2/2009 | Yang | H04W 16/14 455/78 |
| 2009/0135677 A1 | 5/2009 | Veillette | |
| 2010/0110954 A1* | 5/2010 | Kumar | H04L 69/32 370/311 |
| 2010/0153742 A1* | 6/2010 | Kuo | H04L 63/04 713/189 |
| 2010/0177708 A1* | 7/2010 | Pandey | H04W 74/0883 370/329 |
| 2011/0150005 A1 | 6/2011 | Chen et al. | |
| 2011/0185216 A1 | 7/2011 | Zhao et al. | |
| 2012/0257561 A1* | 10/2012 | Redding | H04L 12/1827 370/312 |
| 2013/0003620 A1* | 1/2013 | Dame | H01Q 1/007 370/310 |
| 2013/0128116 A1 | 5/2013 | Knowles | |
| 2013/0155931 A1* | 6/2013 | Prajapati | H04W 72/044 370/311 |
| 2014/0068736 A1* | 3/2014 | Agerstam | H04W 12/06 726/7 |
| 2014/0206346 A1* | 7/2014 | Kiukkonen | H04W 52/0229 455/426.1 |

OTHER PUBLICATIONS

Casas et al., "Synchronization in Wireless Sensor Networks Using Bluetooth," Proceedings of the Third International Workshop on Intelligent Solutions in Embedded Systems, May 2005, 10 pages.

Ringwald et al., "Practical Time Synchronization for Bluetooth Scatternets," Proceedings of the 4th International Conference on Broadband Communications, Networks, and Systems (Broadnets 2007), Sep. 2007, 9 pages.

Specification of the Bluetooth System, Covered Core Package Version: 4.0, Specification vol. 0, Master Table of Contents and Compliance Requirements, Jun. 30, 2010, 106 pages.

Specification of the Bluetooth System, Covered Core Package Version: 4.0, Specification vol. 1, Architecture and Terminology Overview, Jun. 30, 2010, 140 pages.

Specification of the Bluetooth System, Covered Core Package Version: 4.0, Specification vol. 2, Core System Package [BR/EDR Controller Volume], Jun. 30, 2010, 1114 pages.

Specification of the Bluetooth System, Covered Core Package Version: 4.0, Specification vol. 3, Core System Package [Host Volume], Jun. 30, 2010, 656 pages.

Specification of the Bluetooth System, Covered Core Package Version: 4.0, Specification vol. 4, Host Controller Interface [Transport Layer], Jun. 30, 2010, 88 pages.

Specification of the Bluetooth System, Covered Core Package Version: 4.0, Specification vol. 5, Core System Package [AMP Controller Volume], Jun. 30, 2010, 60 pages.

Specification of the Bluetooth System, Covered Core Package Version: 4.0, Specification vol. 6, Core System Package [Low Energy Controller Volume], Jun. 30, 2010, 138 pages.

Taiwanese Patent Application No. 103133336—Office Action dated Jan. 12, 2016.

* cited by examiner

DEVICE SYNCHRONIZATION OVER BLUETOOTH

CROSS REFERENCE TO RELATED APPLICATIONS

This application claims the benefit of U.S. Provisional Application No. 61/883,381, filed Sep. 27, 2013 and entitled "DEVICE SYNCHRONIZATION OVER BLUETOOTH", which is incorporated by reference herein in its entirety for all purposes.

FIELD

The described embodiments relate generally to wireless communications and more particularly to providing time synchronization for a Bluetooth® wireless personal area network (WPAN) communication protocol between a central (server) wireless communication device and a peripheral (client) wireless communication device.

BACKGROUND

Wireless communication devices interconnected through a wireless personal area network, e.g., Bluetooth, can communicate to other wireless communication devices using an asynchronous connectionless link (ACL) using a time division multiple access (TDMA) polling scheme or a synchronous connection oriented (SCO) link using reserved time slots. A set of interconnected Bluetooth devices can be referred to as a piconet, and includes a master device and one or more slave devices. The master device can also be referred to as a central device and the slave devices as peripheral devices. Each Bluetooth device can include an internal timing clock that increments at a 3.2 kHz rate, and absolute clock time values can be stored as 28-bit values in the Bluetooth device. All devices in a Bluetooth piconet synchronously hop between a number of different frequency channels according to a particular sequence. In order for all devices in the piconet to operate synchronously, the master device can provide information about its own internal clock values to the other slave devices in the piconet, e.g., when initiating a connection between the master device and a slave device. In a Bluetooth Classic mode, each slave device can compute an offset value between the slave device's clock values and the master device's clock values based on information provided when initializing the connection between the slave device and the master device. Each device's clocks can continue to increment independently during the connection and can slowly drift with respect to each other over time. A slave device can re-determine the offset value of its clock to the master device's clock by determining updated time information based on when packets are received from the master device. As the Bluetooth clock increments once every 312micro-seconds, the precision of the Bluetooth clock can be insufficient for certain applications, particularly at an application layer level.

SUMMARY

Some embodiments disclosed herein provide for time synchronization over a wireless connection between a central wireless communication device and a peripheral wireless communication device. Events associated with an application and/or service can be time stamped at the central wireless communication device, and one or more link layer messages can be sent to the peripheral wireless communication device to provide time stamp information to replicate the event timing at the peripheral wireless communication device. A first link layer message can include information about an internal wireless communication protocol (e.g., Bluetooth) clock to calibrate (and/or reset) a corresponding internal clock value at the peripheral wireless communication device to match the internal clock value of the central wireless communication device. A second link layer message can include information about a current value for the Bluetooth clock and also a value for an offset that provides a time position (at a finer granularity than the Bluetooth clock) within a timeslot specified by the Bluetooth clock value. The first link layer message can be sent when establishing a "synchronized" connection between the peripheral wireless communication device and the central wireless communication device. The second link layer message can be sent in response to an event occurrence at the central wireless communication device to provide a timestamp reference by which the peripheral wireless communication device can associate a time for the event that occurred at the central wireless communication device. In some embodiments, events can occur at a periodic rate, and the second link layer message can be sent at a rate less than the event rate (to minimize communication requirements and/or power consumption) but at a rate sufficient to ensure proper time synchronization for applications that use the time information provided. Time synchronization of events between the central and peripheral wireless communication devices can provide for power efficiency as the peripheral wireless communication device can send information for a particular application during a known or predictable time period when the central wireless communication device will be awake and/or listening to receive the information for the particular application and enter a dormant state in between transmissions. Application level synchronization for events can be achieved at a finer granularity than an underlying timing mechanism used for communication between the wireless communication devices.

This Summary is provided merely for purposes of summarizing some example embodiments, so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The described embodiments and the advantages thereof may best be understood by reference to the following description taken in conjunction with the accompanying drawings. These drawings are not necessarily drawn to scale, and in no way limit any changes in form and detail that may be made to the described embodiments by one skilled in the art without departing from the spirit and scope of the described embodiments.

DETAILED DESCRIPTION

Figure 1:
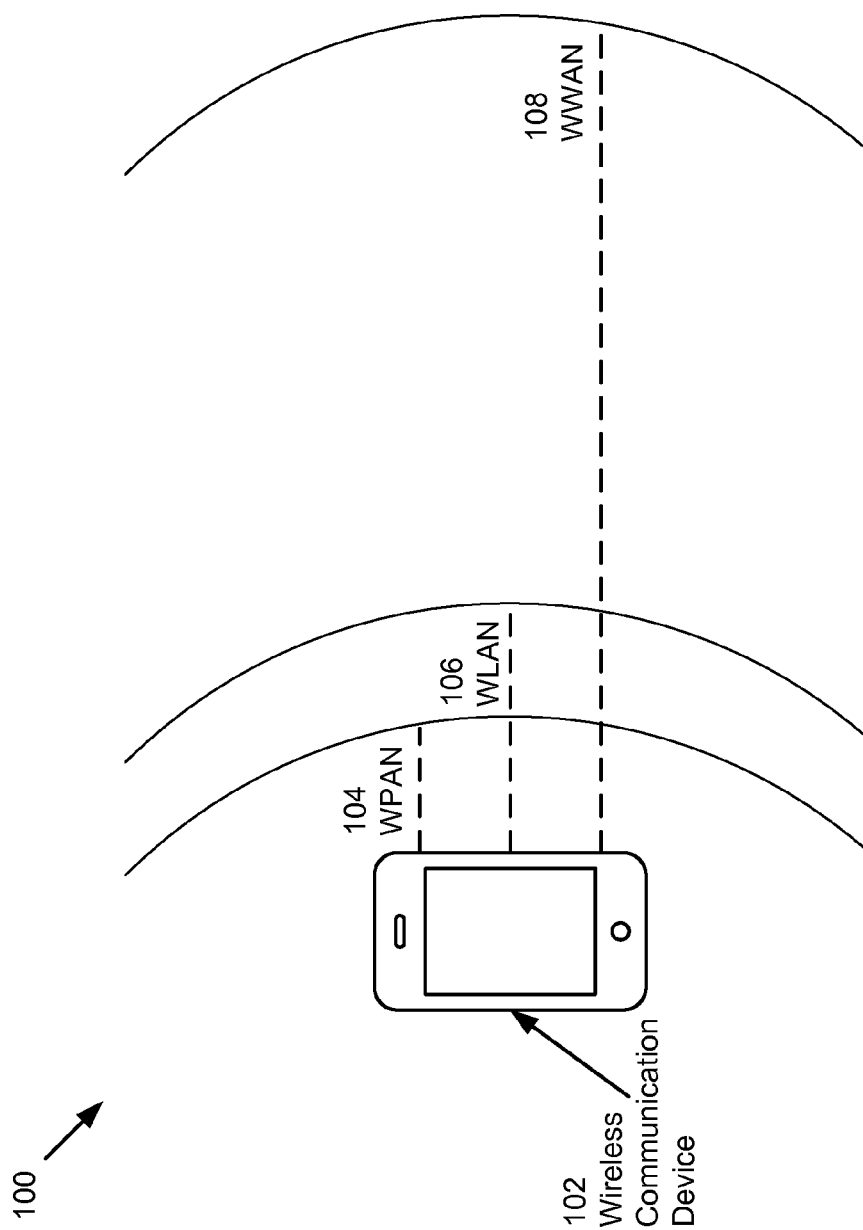
FIG. 1 illustrates a wireless communication device capable of operating in one or more different wireless communication networks in accordance with some embodiments.

The described embodiments relate generally to wireless communications and more particularly to providing time synchronization for a Bluetooth wireless personal area network (WPAN) communication protocol between a central (server) wireless communication device and a peripheral (client) wireless communication device.

Wireless communication devices, and mobile devices in particular, can incorporate multiple different radio access technologies (RATs) to provide connections through different wireless networks that offer different services and/or capabilities. A central wireless communication device can include hardware and software to support a wireless personal area network (WPAN) according to a WPAN communication protocol, e.g., as standardized by the Bluetooth® special interest group (SIG). The central wireless communication device can discover compatible peripheral wireless communication devices and can establish connections to located peripheral wireless communication devices in order to provide specific services through a WPAN.

The central wireless communication device can act as a "master" device to a set of peripheral wireless communication devices that can perform as "slave" devices. The central wireless communication device can control communication on a network formed between the central wireless communication device and the peripheral wireless communication devices. The network can be referred to as a "piconet," and communication by wireless communication devices on the piconet can be "synchronous" to an internal time clock maintained by the central wireless communication device, which can be referred to as a piconet clock. The central wireless communication device can provide information about values for its own internal clock to the peripheral wireless communication devices, e.g., when initializing a connection between the central wireless communication device and the peripheral wireless communication device, and the peripheral wireless communication device can use the information to determine an offset between its own piconet clock and the piconet clock of the central wireless communication device. Bluetooth devices operate using a combination of frequency division multiple access (FDMA), hopping among a set of different frequency channels, and time division multiple access (TDMA), based on a synchronized polling and response mechanism. The central wireless communication device can poll a peripheral wireless communication device at pre-determined time intervals, and the peripheral wireless communication device can wake to listen for a poll and provide data in response to the poll. The peripheral wireless device can sleep between poll time periods to conserve power. In some embodiments, the peripheral wireless device can wake only when required to provide data and sleep otherwise. A connection event between the central wireless communication device and a peripheral wireless communication device can occur when data packets are sent between them on a physical layer channel. For each connection event, based on when a data packet is received from the central wireless communication device, the peripheral wireless communication device can realign its clock or otherwise adjust an offset value to provide for synchronization of its own internal piconet clock to the internal piconet clock of the central wireless communication device. The central and peripheral wireless communication devices can include an application processor (also referred to as a host processor) that can provide higher layer functions. In some embodiments, events that occur at a "system" or "application" level at one wireless communication device, e.g., the central wireless communication device, can be required to be synchronized to parallel events that occur at the system or application level at another wireless communication device, e.g., the peripheral wireless communication device. Each wireless communication device can operate using different absolute system time references, and thus methods are required to communicate "when" an event occurs at the central wireless communication device to the peripheral wireless communication device (or vice versa) with minimal latency accumulating between when the actual time of the event occurred at the central wireless communication device to when knowledge of the event and an associated time value is determined at the peripheral wireless communication device. As described further herein, methods and apparatuses can be provided to transmit event timing information using a set of link layer messages that include a combination of wireless clock information, e.g., associated with Bluetooth wireless circuitry, and system clock information, e.g., associated with a host/application processor in the central wireless communication device, to the peripheral wireless communication device. Associated wireless processing circuitry, e.g., Bluetooth wireless circuitry, in the peripheral wireless communication device can provide accurate clock information to a host/application processor in the peripheral wireless communication device, which can in turn determine a time when one or more events occurred at the central wireless communication device. Synchronization can be achieved without the use of timing recovery associated with voltage controlled crystal oscillators, i.e., each wireless communication device can operate with multiple independent clocks that can drift with respect to each other. In some embodiments, the timing can be communicated between wireless communication devices that use a wireless personal area network (WPAN) protocol. In some embodiments, the timing can be communicated between wireless communication devices that use a power reduced WPAN protocol. In some embodiments, the timing can be communicated between wireless communication devices that use a Bluetooth wireless communication protocol or a Bluetooth Low Energy (BTLE) wireless communication protocol.

FIG. 1 illustrates a set of overlapping networks 100 for a wireless communication device 102. The wireless communication device 102 can include a combination of hardware and software to provide wireless connections over one or more different wireless networks alone, separately, or in combination. The wireless communication device 102 can include hardware and software to provide communication over a wireless personal area network (WPAN) 104 that can provide power efficient connections while operating over a limited range. WPAN connections can typically provide for connecting the wireless communication device 102 to peripheral wireless communication devices, e.g., headsets, earpieces, supplemental display devices, and supplemental input/output devices. A representative WPAN 104 can operate in accordance with a communication protocol specified by the Bluetooth SIG. Different versions of a Bluetooth protocol can provide difference capabilities and services, e.g., optimized for data rates or for power consumption. A version of the Bluetooth wireless communication protocol can be referred to as Bluetooth "Classic", while another more power efficient version can be referred to as Bluetooth "Low Energy." The wireless communication device 102 can also include hardware and software to provide communication over a wireless local area network (WLAN) 106 that can provide a higher data rate and a greater operating range than a WPAN 104. The wireless communication device 102 can include separate hardware and software for the WPAN 104 and the WLAN 106. In some embodiments, the WPAN 104 and the WLAN 106 can share hardware and or software elements in the wireless communication device 102. Both the WPAN 104 and WLAN 106 can operate as "local" networks. The wireless communication device 102 can include additional hardware and software to provide a wireless wide area network (WWAN) 108 capability, e.g., to interconnect with one or more cellular networks.

Figure 2:
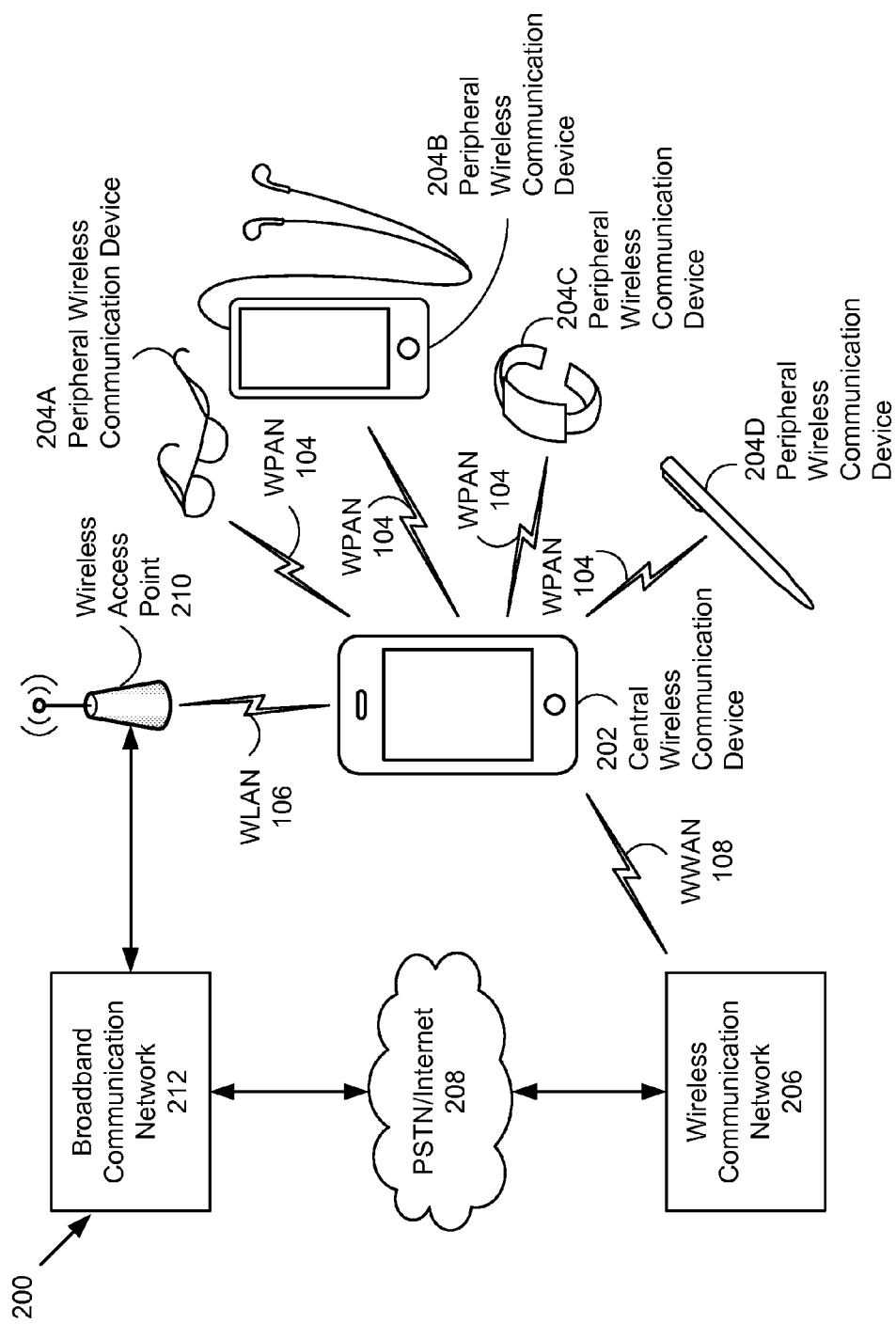
FIG. 2 illustrates a representative set of wireless communication paths interconnecting a central wireless communication device to multiple wireless communication networks and to multiple peripheral wireless communication devices in accordance with some embodiments.

FIG. 2 illustrates a central wireless communication device 202 interconnected through several different wireless communication technologies to an external set of networks and to a set of peripheral wireless communication devices 204A, 204B, 204C, and 204D. The central wireless communication device 202 can receive information from one or more packet switched networks and/or from one or more circuit switched networks, the combination of which is represented in FIG. 2 as a combination of a public switched telephone network (PSTN) and the "Internet" 208. The central wireless communication device 202 can use a WWAN connection 108 provided through a wireless communication network 206 to access a broad variety of services (e.g., voice calls, text messages, data access, video calls, multimedia messaging, and media streaming). Similarly, the central wireless communication device 202 can use a WLAN connection 106 provided through a wireless access point (AP) 210 interconnected to a broadband communication network 212 to access a similar wide range of services. The capabilities of the central wireless communication device 202 can be supplemented by adding one or more WPAN connections 104 to one or more peripheral wireless communication devices 204 as illustrated in FIG. 2.

Some of the peripheral wireless communication devices 204 illustrated in FIG. 2 can provide output display capabilities as well as input response capabilities to allow the user of the central wireless communication device 202 to interact with services through the central wireless communication device 202 (and/or also interact with applications executed by a processor on the central wireless communication device 202). The capabilities of the peripheral wireless communication devices 204 can vary substantially, and therefore each peripheral wireless communication device 204 can provide a different level of I/O functionality. A first peripheral wireless communication device 204A can provide an "always available" visible display capability that can present information to the user of the central wireless communication device 202, with a limited input response capability to browse through and/or respond to the presented information. A second peripheral wireless communication device 204B can provide a primary service and/or application function, e.g., acting as a media player, while also including a display, a touch interface, and one or more wireless connection functions, to permit use as a supplemental display for information provided from the central wireless communication device 202. The second peripheral wireless communication device 204B can provide input/output capabilities for presenting information and accepting user responses similar to that offered by the central wireless communication device 202. A third peripheral wireless communication device 204C can provide a readily accessible display and touch interface that can also present information to a user of the central wireless communication device 202 and allow for flexibly organizing the information presented and accept user inputs to browse and respond to the information. A fourth peripheral wireless communication device 204D can provide limited (if any) display capabilities and can be designed to provide supplemental input capabilities, e.g., as offered by a stylus device that can interact with a display screen (or other input mechanism) of the central wireless communication device 202. The fourth peripheral wireless communication device 204D, in some embodiments, can be connected to the central wireless communication device through a WPAN connection 104 while also providing a supplementary input, e.g., a radio frequency, infrared, magnetic, electric field, capacitive touch, or other input sensing mechanism signal. A touch sensitive display (or more generally an input/output capability) of the central wireless communication device 202 can sense the supplementary input of the fourth peripheral wireless communication device 204D, and, in some embodiments, can provide feedback to the user through the display. The WPAN connection 104 can be used to provide a method to synchronize supplementary inputs generated by the fourth peripheral wireless communication device 204D (e.g., a stimulus output provided by the fourth peripheral wireless communication device 204D) that can be sensed/received by the central wireless communication device 202 (e.g., through a scan function). By providing a method to synchronize applications and/or services between the central wireless communication device 202 and one or more peripheral wireless communication devices 204 A/B/C/D, a user of the central wireless communication device 202 can control and/or receive feedback from peripheral wireless communication devices 204 A/B/C/D that can be used for various applications. In a representative embodiment, a peripheral wireless communication device 204 A/B/C/D can provide position information (e.g., translational position x/y/z and/or rotational position yaw/pitch/roll) to the central wireless communication device 202, which can in turn use the information to present information on the central wireless communication device 202 to a user thereof. In an embodiment, the peripheral wireless communication device 204 A/B/C/D and/or the central wireless communication device 202 can include one or more motion sensors, e.g., as part of a motion processing unit, and information provided therefrom can be used to control and/or as inputs to applications on the central wireless communication device 202, the peripheral wireless communication device 204 A/B/C/D, or both. In some embodiments, applications on the central wireless communication device 202 can be time synchronized to applications on the peripheral wireless communication device 204 A/B/C/D. As described further herein, time information at the system/application level can be provided between the central wireless communication device 202 and one or more peripheral wireless communication devices 204 A/B/C/D through an exchange of link layer messages to ensure precise "absolute" time synchronization between the wireless communication devices.

Figure 3:
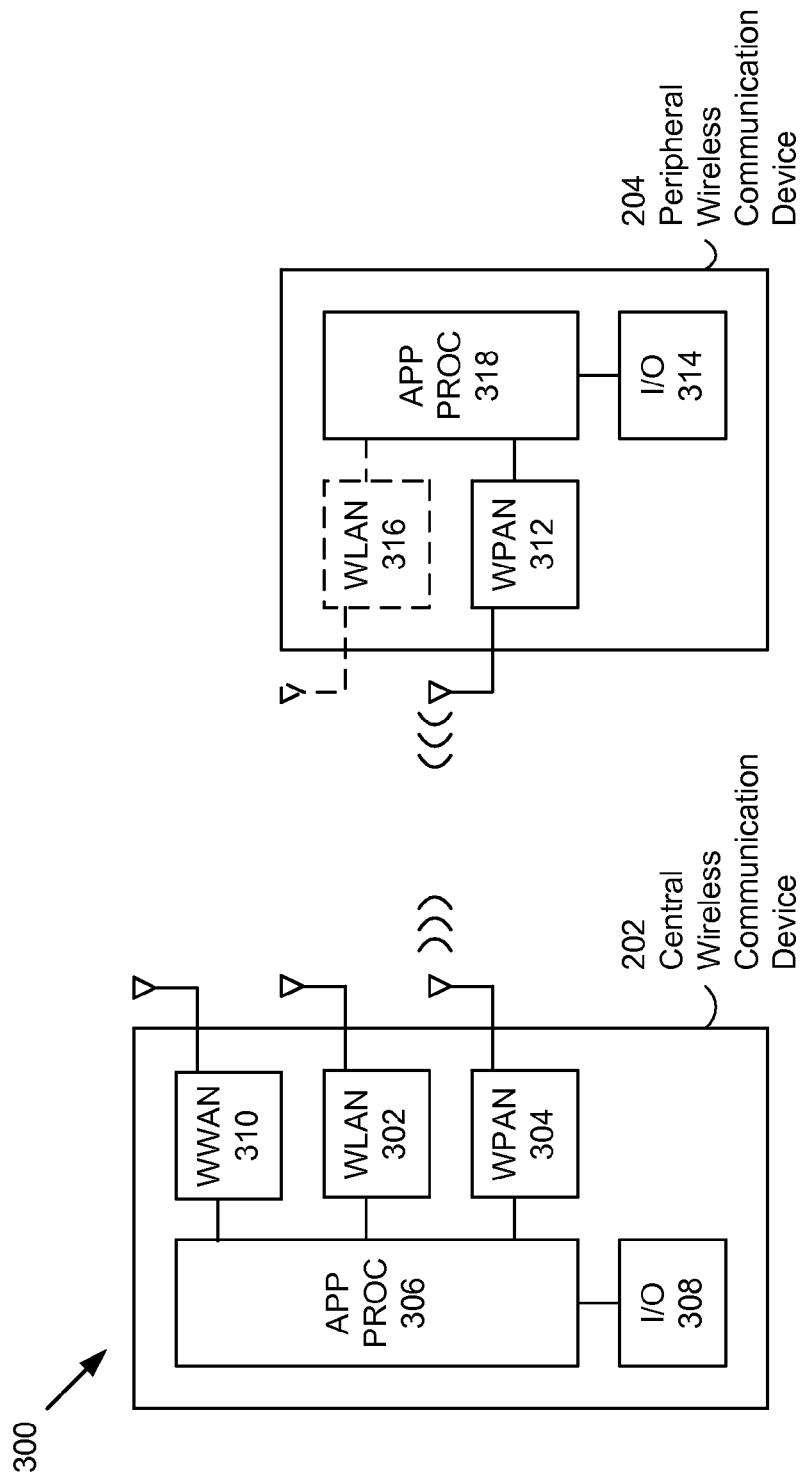
FIG. 3 illustrates a direct wireless personal area network connection between the central wireless communication device and a peripheral wireless communication device in accordance with some embodiments.

FIG. 3 illustrates a diagram 300 of a representative embodiment of elements included in the central wireless communication device 202 to communicate through a WPAN connection to a representative embodiment of elements included in the peripheral wireless communication device 204. The central wireless communication device 202 can include multiple wireless networking hardware/software blocks (also referred to as wireless circuitry) to provide connections in accordance with one or more different wireless communication protocols. A wireless networking hardware/software block can include a combination of hardware and/or software for a wireless transmitter and a wireless receiver (also referred to in combination as a wireless transceiver) or elements thereof. The central wireless communication device 202 can connect to external networks through a WLAN hardware/software block 302 and/or a WWAN hardware/software block 310. The central wireless communication device 202 can include processing circuitry coupled to the wireless networking hardware/software blocks to control the central wireless communication device 202, e.g., an application processor 306. The application processor 306 in the central wireless communication device 202 can establish connections and process information obtained through established connections to offer different services to the user of the central wireless communication device 202. The user of the central wireless communication device 202 can interact with the central wireless communication device 202 through an input/output (I/O) interface 308, which can provide for displaying information and accepting user inputs to navigate information and/or access services available on and/or through the central wireless communication device 202. In some embodiments, the central wireless communication device 202 can accommodate multiple I/O interfaces 308. In some embodiments, a combination of software executing on the application processor 306 can provide a user interface input and output capability through the I/O interface 308 to display information (outputs) to the user of the central wireless communication device 202 and/or to obtain feedback (inputs) from the user of the central wireless communication device 202, including for example to and from the peripheral wireless communication device 204 connected to the central wireless communication device 202.

The central wireless communication device 202 can be connected using a WPAN hardware/software block 304 to the peripheral wireless communication device 204, which in turn can include a parallel WPAN hardware/software block 312 connected to its own application processor 318. The application processor 318 in the peripheral wireless communication device 204 can provide input and output capabilities through a I/O interface 314 and supplement the I/O capabilities of the central wireless communication device 202 to provide the user of the central wireless communication device 202 an alternate I/O interface through which to receive and respond to information. In some embodiments, the I/O interface 314 can provide a more limited display of information than offered by the I/O interface 308 of the central wireless communication device 202. The application processor 318 of the peripheral wireless communication device 204 can process information received through the WPAN hardware/software block 312 to display information through the I/O interface 314 and/or to control operation of one or more applications on the peripheral wireless communication device 204. The application processor 318 can process user inputs received through the I/O interface 314 to form and send messages using the WPAN hardware/software block 312. The application processor 318 in the peripheral wireless communication device 204 can also organize and store information received from the central wireless communication device 202. The application processor 318 can process information received from the application processor 306 of the central wireless communication device 202, e.g., to align "event" timing on the peripheral wireless communication device 204 to parallel events on the central wireless communication device 202.

Wireless circuitry in the central wireless communication device 202 and in the peripheral wireless communication device 204 can include one or more wireless circuitry modules that include one or more processors and wireless circuitry to transmit and receive wireless signals according to various wireless communication protocols. A wireless circuitry module (also referred to as a wireless subsystem) of the central and peripheral wireless communication devices 202/204 can include transmitters and receivers to provide signal processing of radio frequency wireless signals formatted according to wireless communication protocols, e.g., according to a Wi-Fi wireless communication protocol, a Bluetooth wireless communication protocol, or a cellular wireless communication protocol. In some embodiments, the wireless circuitry module can include components such as: processors and/or specific-purpose digital signal processing (DSP) circuitry for implementing functionality such as, but not limited to, baseband signal processing, physical layer processing, data link layer processing, and/or other functionality; one or more digital to analog converters (DACs) for converting digital data to analog signals; one or more analog to digital converters (ADCs) for converting analog signals to digital data; radio frequency (RF) circuitry (e.g., one or more amplifiers, mixers, filters, phase lock loops (PLLs), and/or oscillators); and/or other components. The wireless circuitry module can be also referred to as a radio in some embodiments.

Figure 4:
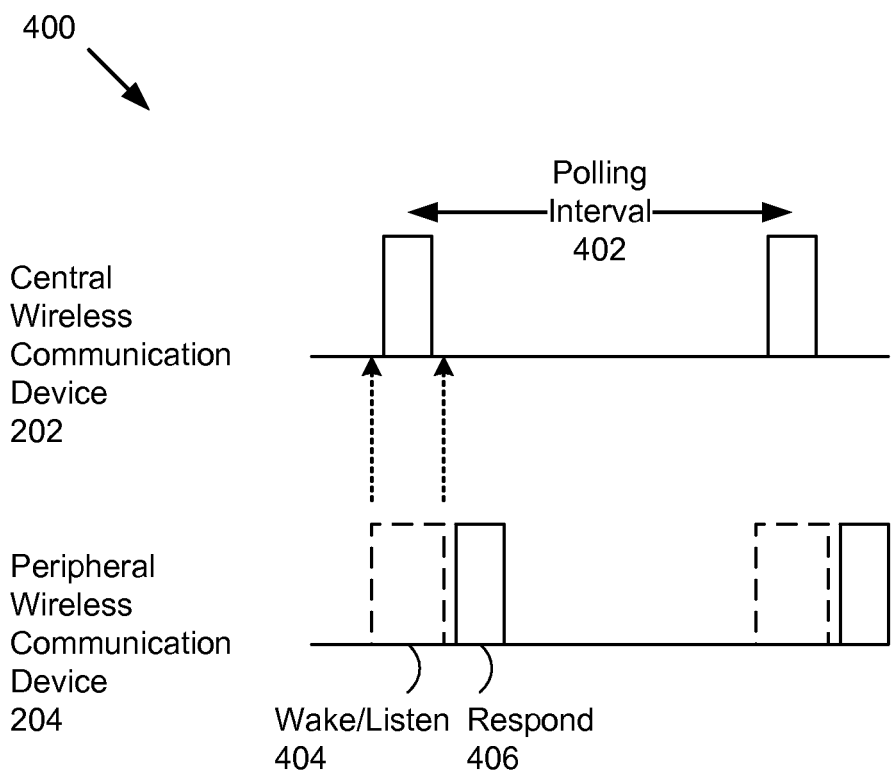
FIG. 4 illustrates a representative synchronous polling mechanism used for communication between a central wireless communication device and a peripheral wireless communication device in accordance with some embodiments.

FIG. 4 illustrates a diagram 400 of a representative synchronous polling mechanism used for communication between a central wireless communication device 202 and a peripheral wireless communication device 204 in accordance with some embodiments. When establishing a connection between the central wireless communication device 202 and the peripheral wireless communication device 204, timing information can be exchanged to align time periods for when the central wireless communication device 202 will poll the peripheral wireless communication device 204 for data. The peripheral wireless communication device 204 can sleep in between polling time intervals, and in some embodiments can wake when required to provide data to the central wireless communication device 202, thereby conserving power and providing for extended battery life in the peripheral wireless communication device 204. The central wireless communication device 202 can poll the peripheral wireless communication device 204 at a pre-determined time and according to a regular pre-determined polling time interval 402. The peripheral wireless communication device 204 can maintain its own internal clock (also referred to as a piconet clock) and wake at a wake/listen time period 404 in which to listen for a poll from the central wireless communication device 202 and to provide data to the central wireless communication device 202 during a response time interval 406 following the wake/listen time period 404. As illustrated in FIG. 4, the peripheral wireless communication device 204 can account for clock drift between a piconet clock of the central wireless communication device 202 and a piconet clock of the peripheral wireless communication device 204 (e.g., assuming a maximum clock difference between the respective piconet clocks) and open the wake/listen time period 404 sufficiently early and for a long enough time period to ensure capturing the poll from the central wireless communication device 202. As illustrated in FIG. 4, the wake/listen time period 404 of the peripheral wireless communication device 204 can start before the polling time period of the central wireless communication device 202 and can end after the polling time period of the central wireless communication device 202. The clock drift can be sufficiently small that the additional time to extend the wake/listen time period 404 relative to the polling time period can be minimal. In some embodiments, the central wireless communication device 202 can include clock time information when communicating with the peripheral wireless communication device 204 to provide for realigning the clock at the peripheral wireless communication device 204 to the clock of the central wireless communication device 202, e.g., a value for a piconet clock of the central wireless communication device 202 can be provided to the peripheral wireless communication device 204. In some embodiments, the clock time information can be provided when establishing a connection between the central wireless communication device 202 and the peripheral wireless communication device 204. In some embodiments, the peripheral wireless communication device 204 can adjust its own piconet clock based on a local time when a poll is received from the central wireless communication device 202. In an embodiment, upon waking, listening for, and receiving a poll from the central wireless communication device 202, the peripheral wireless communication device 204 can maintain accurate piconet clock time values for its own piconet clock synchronized with the piconet clock of the central wireless communication device 202.

Figure 5A:
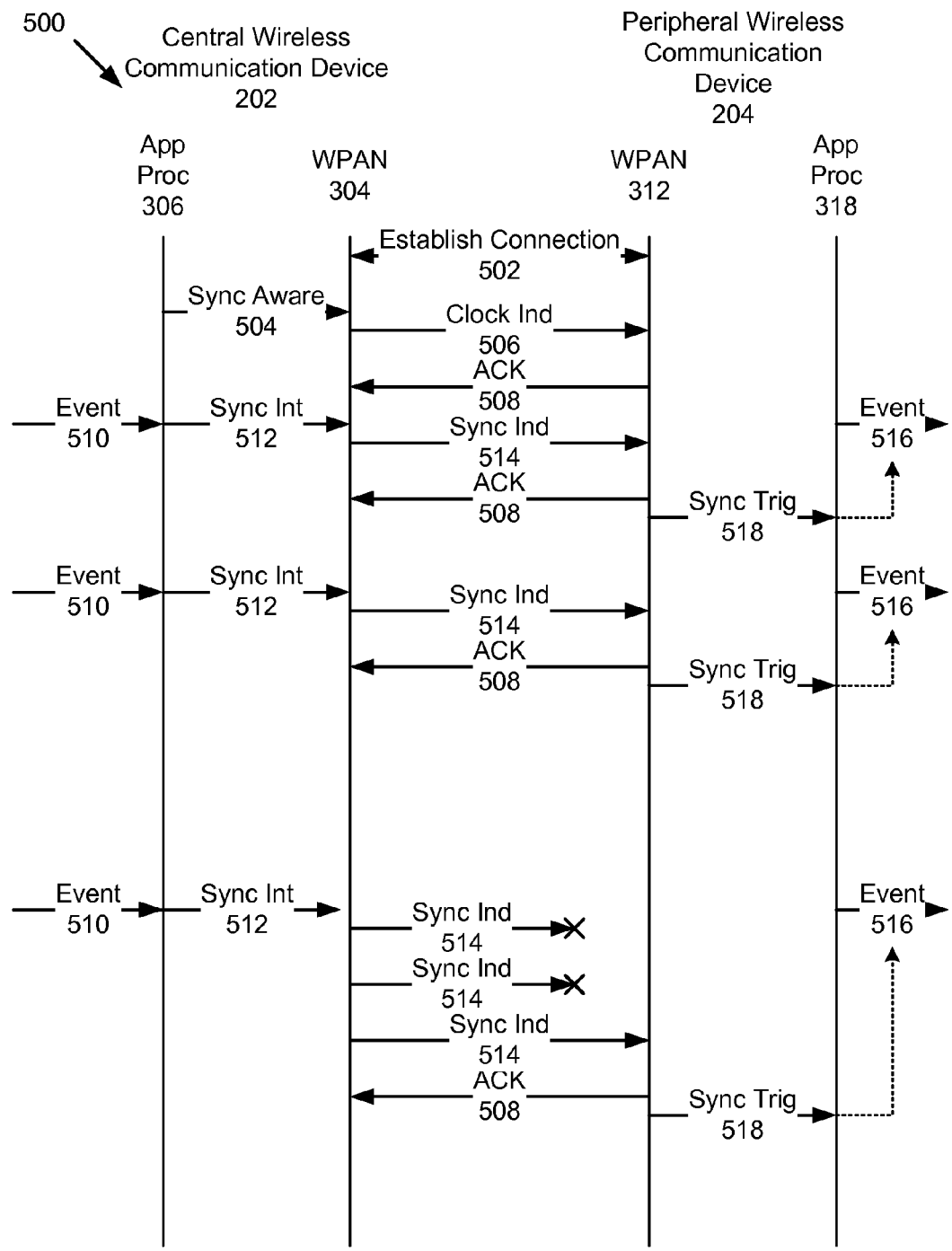
FIG. 5A illustrates an exchange of messages between a central wireless communication device and a peripheral wireless communication device for time synchronization in accordance with some embodiments.

FIG. 5A illustrates a diagram 500 of an exchange of messages between a central wireless communication device 202 and a peripheral wireless communication device 204 for time synchronization in accordance with some embodiments. The central wireless communication device 202 can include an application processor 306, as illustrated in FIG. 3, that can control and/or run applications and services at higher layers for the central wireless communication device 202. Similarly the peripheral wireless communication device 204 can include an application processor 318 for controlling and running applications at the higher layers on the peripheral wireless communication device 204. The application processors 306/318 can also be referred to as host processors, in some embodiments. The WPAN 304 (e.g., Bluetooth) circuitry of the central wireless communication device 202 can establish a connection 502 with the WPAN circuitry 312 of the peripheral wireless communication device 204. In a representative embodiment, the connection between the central wireless communication device 202 and the peripheral wireless communication device 204 is a Bluetooth Low Energy (BTLE) connection. Once the BTLE connection is established, the central wireless communication device 202 can identify whether the peripheral wireless communication device 204 supports a time synchronization feature that provides for application level (i.e., event level) time synchronization. In some embodiments, the central wireless communication device 202 determines the capabilities of the peripheral wireless communication device 204 using a service discovery protocol. In some embodiments, the BTLE communication link is encrypted to provide a secure connection between the central wireless communication device 202 and the peripheral wireless communication device 204. In response to detecting that the peripheral wireless communication device 204 supports time synchronization for events/applications, the application processor 306 can provide an indication to the WPAN circuitry 304 that the peripheral wireless communication device 204 can be "time sync aware." The application processor 306 of the central wireless communication device 202 can provide a vendor specific command to the WPAN circuitry 304, as indicated in FIG. 5A using a "Sync Aware" message 504, which can be a vendor specific message or command in some embodiments. The "Sync Aware" message 504 can include one or more parameters. Representative parameters for the "Sync Aware" message 504 can include a "Connection Handle" of the BTLE connection to indicate that it is "Sync Aware", i.e., an indication that the specific BTLE connection has this capability. In an embodiment, the "Connection Handle" parameter can include two octets of information. The "Sync Aware" message 504 can also include a "Sync Indication Period" parameter that can specify a frequency at which the WPAN circuitry 304 is required to generate link layer synchronization indication messages (discussed further herein) to the peripheral wireless communication device 204 over the BTLE connection. In an embodiment, the "Sync Indication Period" is specified in units of a reference time interval, e.g., units of micro-seconds, milliseconds, tens of milliseconds, hundreds of milliseconds, etc., and the "Sync Indication Period" parameter can use two octets to provide the information. In some embodiments, tagging the BTLE connection as "Sync Aware" is optional. In some embodiments, the use of a "Sync Indication Period" is optional, and Sync Indications can be provided on an as needed basis, e.g., in response to specific events and/or interrupts generated at and/or by the application processor 306.

A BTLE connection can require clock synchronization between the central wireless communication device 202 and the peripheral wireless communication device 204 at a frame boundary level, e.g., at each 1.25 ms frame start. The central wireless communication device 202 and the peripheral wireless communication device 204 can be "synchronized" by agreeing on a connection time period and a frame start time instant for the BTLE connection. The central wireless communication device 202 and the peripheral wireless communication device 204 can maintain their own separate independent clocks (e.g., also referred to as piconet clocks) and can wake up periodically to communication with each other. The peripheral wireless communication device 204 can adjust its own clock based on information provided by the central wireless communication device 202, e.g., based on information provided in a packet communicated when initializing a connection. The peripheral wireless communication device 204 can also adjust its own piconet clock based on when a packet is received by the peripheral wireless communication device 204 to realign with the central wireless communication device clock in order to maintain the 1.25 ms frame synchronization. To communicate an exact instance of a synchronization signal that occurs on the central wireless communication device 202 to the peripheral wireless communication device 204, each of the wireless communication devices 202/204 can be required to be synchronized to all 28 bits of a Bluetooth piconet clock. The central wireless communication device 202 can serve as a "master" clock reference to the peripheral wireless communication device 204, which can serve as a "slave" device. A proprietary link layer "Clock Indication" message 506, which can be formatted as a Clock Indication PDU 600 in some embodiments, can be sent by the WPAN circuitry 304 of the central wireless communication device 202 in response to the Application processor 306 of the central wireless communication device 202 tagging the BTLE link as "Sync Aware" using the "Sync Aware" message 504, e.g., which can be a vendor specific "Sync Aware" command in some embodiments. The "Clock Indication" message 506 can contain a "snapshot" of the central wireless communication device's 202 piconet clock at the start of a connection event. The peripheral wireless communication device 204 can use the clock information provided by the "Clock Indication" message 506 to adjust its own piconet clock. This adjustment can ensure so that both the central wireless communication device 202 and the peripheral wireless communication device 204 use the same reference clock time values. The "Clock Indication" message 506 can include a real time piconet clock value from the central wireless communication device 202. In some embodiments, the clock value can be specified as all or a portion of the 28 bits of the piconet clock of the central wireless communication device 202. In an embodiment, the clock value can include the 26 most significant bits of the 28-bit clock value. In an embodiment, the clock value can include the same information as provided in a frequency hopping synchronization (FHS) packet. In an embodiment, the clock value is captured by the central wireless communication device 202 at the start of a 1.25 ms frame, and thus a portion of the clock value (e.g., the two least significant bits) can have a zero value and need not be transmitted to the peripheral wireless communication device 204. In response to the "Clock Indication" message 506, the WPAN circuitry 312 of the peripheral wireless communication device 204 can reply with a "baseband" acknowledgement (ACK) message, e.g., ACK 508 or can reject the "Clock Indication" message using a link layer "Reject Indication" message (not shown). In some embodiments, the "Clock Indication" message 506 can be resent by the WPAN circuitry 304 of the central wireless communication device 202 if not acknowledged or received correctly by the WPAN circuitry 312 of the peripheral wireless communication device 204. The peripheral wireless communication device 204 can calculate a correct value for the current piconet clock of the central wireless communication device 202 based on the information provided in the "Clock Indication" message 506 even if only successfully received after a number of retransmissions. In an embodiment, the "Clock Indication" message 506 includes an event counter at which the real time clock information is snapped. The WPAN circuitry 312 of the peripheral wireless communication device 204 can update its own local piconet clock based on the information provided by the central wireless communication device 202 in the "Clock Indication" message 506, and following the update, the two piconet clocks in each of the central wireless communication device 202 and the peripheral wireless communication device 204 can be synchronized to use the same "absolute" time values. As each piconet clock can drift over time, (they can be connected to different, independent clock oscillators), the time values of the piconet clocks can be readjusted based on additional information provided to the peripheral wireless communication device 204 from the central wireless communication device 202 and/or by determining adjustments based on when packets are received by the peripheral wireless communication device 204.

Figure 6:
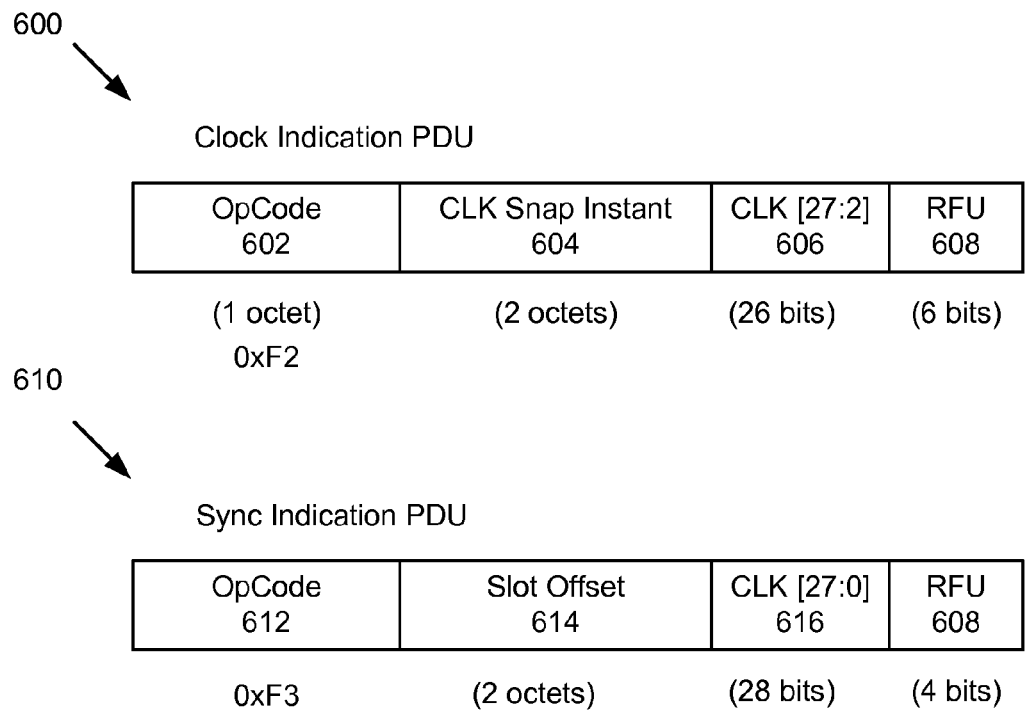
FIG. 6 illustrates a format for messages communicated between the central wireless communication device and the peripheral wireless communication device to provide time synchronization in accordance with some embodiments.

In order to provide time synchronization information from the central wireless communication device 202 to the peripheral wireless communication device 204, the application processor 306 can generate a time synchronization interrupt 512 to the WPAN circuitry 304 each time that an event 510 occurs at the application processor 306. The WPAN circuitry 304 of the central wireless communication device 202 can ignore any Sync Interrupts 512 received from the host/application processor 306 until the communication link with the peripheral wireless communication device 204 (e.g., a BTLE link) is tagged as "Sync Aware", e.g., as indicated by a Sync Aware message 504 provided to the WPAN circuitry 304 of the central wireless communication device 202. The WPAN circuitry 304 can also ignore Sync Interrupts 512 until the link layer Clock Indication 506 message provided by the central wireless communication device 202 to the peripheral wireless communication device 204 is acknowledged (e.g., as indicated by an ACK 508) by the WPAN circuitry 312 of the peripheral wireless communication device 204. When the communication link is tagged as "Sync Aware" and the link layer Clock Indication 506 message is acknowledged, (which can provide an indication that the piconet clock of the WPAN circuitry 312 of the peripheral wireless communication device 204 is synchronized to the piconet clock of the WPAN circuitry 304 of the central wireless communication device 202), then a Sync Interrupt 512 provided to the WPAN circuitry 304 can be processed by the WPAN circuitry 304. The WPAN circuitry 304 of the central wireless communication device 202 can send a proprietary link layer "Sync Indication" message 514 to the WPAN circuitry 312 of the peripheral wireless communication device 204 in response to receiving the Sync Interrupt 512 from the host/application processor 306. In some embodiments, the Sync Indication message 514 can be formatted as a protocol data unit, e.g., a Sync Indication PDU 610 as shown in FIG. 6. The Sync Indication message 514 can provide time information indicating when the event 510 occurred at the application processor 306 of the central wireless communication device 202 as indicated by the Sync Interrupt 512. The Sync Indication message 514 can include a value of the 28-bit real time piconet clock of the central wireless communication device 202 at the time that the sync interrupt occurred. This 28-bit value can provide a resolution down to a time period of one-half of a time slot interval for a BTLE connection, which can correspond to a resolution of 312 micro-seconds. To provide a finer time resolution, the Sync Indication message 514 can further include a time slot offset value, which can provide an amount of "offset" time within a half time slot time interval in which the sync interrupt occurred. The time slot offset value can narrow the time of the event to a finer precision than provided by the BTLE clock, e.g., by using a higher frequency system level clock or other means that counts at a higher rate. In an embodiment, the time offset can provide a value for a number of micro-seconds within the half time slot of 312 micro-seconds, e.g., using a value selected from a set of values from 0 to 312. In some embodiments, the host/application processor 306 can adjust a value for the piconet clock and/or a value for the half timeslot offset time included in Sync Indication message 514 to account for an interrupt delay time period at the application processor 306 and/or at the WPAN circuitry 304, to account for processing delays of the application processor 306 and/or the WPAN circuitry 304, and/or to include any arithmetic adjustments to the clock values required to handle rollover.

As indicated in FIG. 5A, the WPAN circuitry 312 of the peripheral wireless communication device 204 can provide an acknowledgement (e.g., ACK 508) to the WPAN circuitry 304 of the central wireless communication device 202 in response to correct reception of the Sync Indication message 514. In some embodiments, the WPAN circuitry 304 of the central wireless communication device 202 provides a Sync Indication message 514 that includes current time information to the WPAN circuitry 312 of the peripheral wireless communication device 204 in response to each Sync Interrupt 512 received from the application processor 306. For example, as shown in FIG. 5A, each event 510 at the application processor 306 generates a Sync Interrupt 512 and then a corresponding Sync Indication message 514 is transmitted subsequently from the central wireless communication device 202 to the peripheral wireless communication device 204. In an embodiment, the Sync Indication message 514 can be retransmitted by the WPAN circuitry 304 of the central wireless communication device when no ACK 508 is received (or a reject or other negative acknowledgement (NAK) type message is received) from the WPAN circuitry 312 of the peripheral wireless communication device 204. The central wireless communication device 202 can retransmit one or more Sync Indication message(s) 514 until an ACK 508 is received from the peripheral wireless communication device 204 or until a timer expires (not shown). The same Sync Indication message 514 can be sent each time during retransmission, in some embodiments, e.g., the time values included in retransmitted Sync Indication message(s) 514 need not be recalculated, as the time period for retransmission can be relatively short compared with a time period for transmission and reception of the Sync Indication message(s) 514. In some embodiments, Sync Interrupts 512 can be processed by the WPAN circuitry 304 and can result in transmission of a Sync Indication message 514 to the WPAN circuitry 312 of the peripheral wireless communication device 204 each time that a Sync Interrupt 512 is received. In some embodiments, Sync Interrupts 512 can be processed at the end of a Sync Indication time period specified by the host/application processor 306, e.g., as indicated during establishment of the connection to the peripheral wireless communication device 204 and/or as indicated in the "Sync Aware" message 504.

The WPAN circuitry 312 of the peripheral wireless communication device 204 can generate a Sync Trigger message 518 using an interrupt to the application processor 318 of the peripheral wireless communication device 204. The WPAN circuitry 312 of the peripheral wireless communication device 204 can use the information provided by the Sync Indication message 514, e.g., values for the piconet clock and the half timeslot offset values provided therein, with a value of its own piconet clock (e.g., when the Sync Indication message 514 is received by the WPAN circuitry 312) and knowledge of message processing delays to determine a corresponding time at which the last Sync Interrupt 512 was generated at the central wireless communication device 202. The WPAN circuitry 312 of the peripheral wireless communication device 204 can provide the calculated time (e.g., as a value in micro-seconds) to the application processor 318 of the peripheral wireless communication device 204, which can use the calculated time information and a time when the Sync Trigger message 518 is provided, e.g., as an interrupt to the application processor 318, to determine a time of a corresponding event 516 in the peripheral wireless communication device 204. The time of the corresponding event 516 is determined for the time domain of the host/application processor 318 of the peripheral wireless communication device 204 and corresponds to an event 510 that occurs at the central wireless communication device 202 in a time domain of the host/application processor 306 of the central wireless communication device 202. In an embodiment, the Sync Trigger message 518 can include a time value in micro-seconds for an elapsed time since the sync trigger was generated on the central wireless communication device 202. The time value included in the Sync Trigger message 518 can include processing delays of the WPAN circuitry 312 at the peripheral wireless communication device 204. In an embodiment, the Sync Trigger message 518 can include the time as four octets of information. As illustrated in FIG. 5A, the WPAN circuitry 312 and/or the host/application processor 318 can determine a time offset so that the time of the recreated event 516 corresponds to the proper time for the originating event 510, even in the presence of lost and retransmitted Sync Indication messages 514.

Figure 5B:
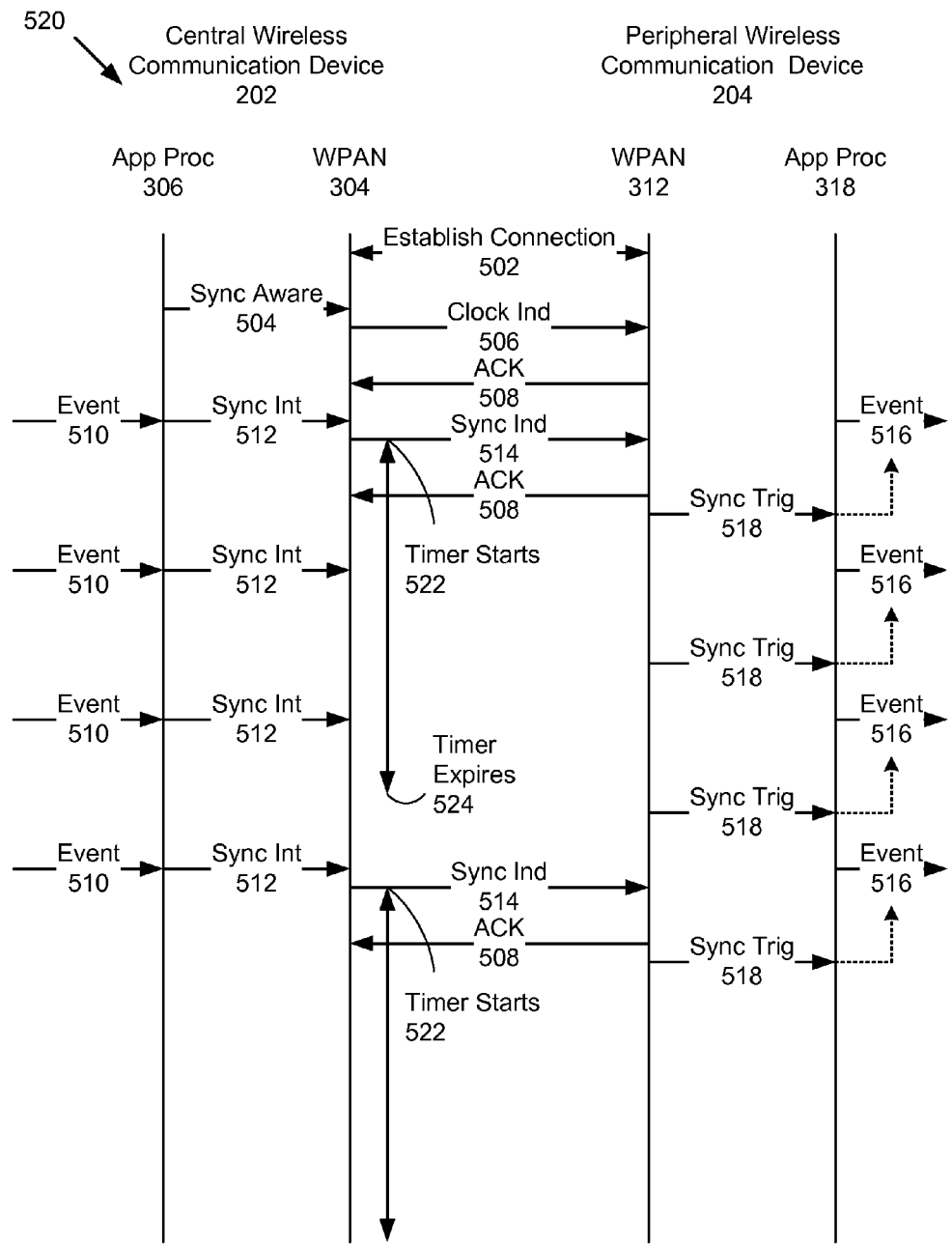
FIG. 5B illustrates another exchange of messages between a central wireless communication device and a peripheral wireless communication device for time synchronization in accordance with some embodiments.

FIG. 5B illustrates a diagram 520 of another exchange of messages between the central wireless communication device 202 and the peripheral wireless communication device 204 for time synchronization in accordance with some embodiments. In some embodiments, the WPAN circuitry 304 of the central wireless communication device 202 maintains a periodic timer having a time period for Sync Indication messages as specified by the host/application processor 306 of the central wireless communication device 202. The WPAN circuitry 304 can ignore Sync Interrupts 512 that occur while the timer is running. Once the timer expires, the WPAN circuitry 304 can process a next Sync Interrupt 512 and transmit a Sync Indication message 514 message to the WPAN circuitry 312 of the peripheral wireless communication device 204. The WPAN circuitry 304 of the central wireless communication device 202 can restart the timer 522 each time that a Sync Indication message 514 is sent. In some embodiments, the events 510 at the host/application processor 306 of the central wireless communication device 202 can occur at regular (e.g., periodic) time intervals, and the corresponding sync interrupts 512 to the WPAN circuitry 304 of the central wireless communication device 202 can also occur at regular intervals. In an embodiment, the WPAN circuitry 312 of the peripheral wireless communication device 204 can be aware of the nominal time period of events/interrupts that occur at the central wireless communication device 202 and can generate sync trigger messages 518 that interrupt the application processor 318 of the peripheral wireless communication device 204 in between reception of actual Sync Indication messages 514 messages from the central wireless communication device 202. The host/application processor 318 of the peripheral wireless communication device 204 can recreate events 516 based on sync trigger messages 518 received from the WPAN circuitry 312. While the piconet clock of the WPAN circuitry 312 of the peripheral wireless communication device 204 can "drift" during a time period between when Sync Indication messages 514 messages are received from the central wireless communication device 202, the amount of drift of the piconet clock can be minimal. Using a timer at the central wireless communication device 202 can reduce a frequency rate at which Sync Indication messages 514 are sent to the peripheral wireless communication device 204, thereby minimizing communication requirements and/or lowering power consumption. The peripheral wireless communication device 204 can "interpolate" timing for Sync Trigger messages 518 in between the reception of Sync Indication messages 514 from the central wireless communication device 202, thereby continuing to provide "interrupts" to the host/application processor 318 in the peripheral wireless communication device 204 for generating events.

Figure 5C:
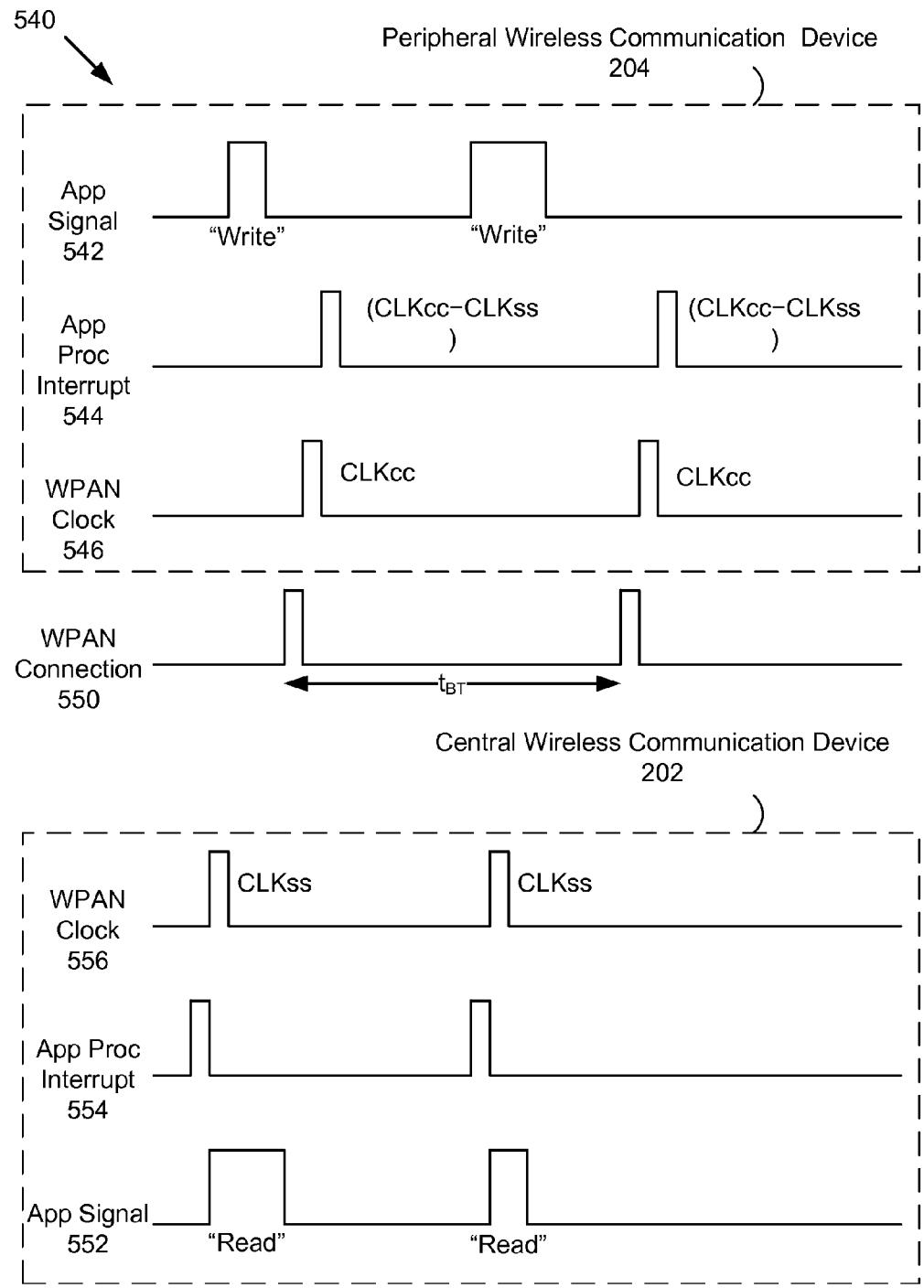
FIG. 5C illustrates a representative set of internal signals that can be used to coordinate time synchronization of events between a central wireless communication device and a peripheral wireless communication device in accordance with some embodiments.

FIG. 5C illustrates a diagram 540 of a representative set of internal signals that can be used to coordinate time synchronization of events between a central wireless communication device 202 and a peripheral wireless communication device 204 in accordance with some embodiments. The central wireless communication device 202 can be connected through a WPAN connection 550 to the peripheral wireless communication device 204. As described herein, the WPAN connection 550 can provide a relatively time synchronized channel, i.e., information about clock time values, e.g., a Bluetooth clock, can be provided between the central wireless communication device 202 and the peripheral wireless communication device 204 to align clocks in the WPAN circuitry 304/312 of the respective wireless communication devices 202/204. An application running on the central wireless communication device 202 can be synchronized to another application running on the peripheral wireless communication device 204 by providing time synchronization information between the central wireless communication device 202 and the peripheral wireless communication device 204. In an embodiment, the peripheral wireless communication device 204 and/or the central wireless communication device 202 can be battery powered, and minimization of power consumption while providing one or more functions for applications can be desired. For example, the central wireless communication device 202 can seek to "read" information provided by the peripheral wireless communication device 204. Rather than having the central wireless communication device 202 attempt to read the information from the peripheral wireless communication device 204 continuously, which would drain battery power of the central wireless communication device 202, the central wireless communication device 202 can instead read information at regular intervals and/or "on demand" based on requirements of the application running on the central wireless communication device 202. In a representative embodiment, the central wireless communication device 202 collects sensor data from the peripheral wireless communication device 204. In another representative embodiment, the central wireless communication device 202 detects a two-dimensional or three-dimensional position and/or orientation of the peripheral wireless communication device 204. In some embodiments, the information obtained and/or detected by the central wireless communication device 202 from the peripheral wireless communication device 204 is provided through a WPAN communication link, e.g., the WPAN Connection 550 can provide bi-directional information transfer. In some embodiments, the information obtained and/or detected by the central wireless communication device 202 from the peripheral wireless communication device 204 is provided through a secondary mechanism (e.g., via another communication link and/or via a separate detection mechanism). In an embodiment, the central wireless communication device 202 detects a position and/or an orientation of the peripheral wireless communication device 204 with respect to the central wireless communication device 202. In an embodiment, the central wireless communication device 202 includes a touch sensitive display (or other surface having detection capabilities), and the peripheral wireless communication device 204 is a battery operated device that provides a stimulus signal that can be sensed by the central wireless communication device 202. In some embodiments, the central wireless communication device 202 reads information provided by the peripheral wireless communication device 204 at regular time intervals and provides visual feedback to a user of the central wireless communication device 202 on a display provided therein. As the peripheral wireless communication device 204 can be battery powered, it can be desired to have the peripheral wireless communication device 204 supply information (e.g., a message and/or a stimulus signal) at regular time intervals and/or "on demand" and to operate in a power-reduced state in between the "stimulus" time periods. Using the time synchronization methods described herein, the central wireless communication device 202 and the peripheral wireless communication device 204 can be time synchronized at an application level to enable the peripheral wireless communication device 204 to provide intermittent output, stimulus, and/or information at time periods that can be known and/or predicted and/or estimated by the central wireless communication device 202, which can in turn obtain, read, and/or perceive the output, stimulus, and/or information from the peripheral wireless communication device 204 at appropriate time periods. With application level time synchronization methods described herein, the central wireless communication device 202 can "read" at appropriate time periods, and the peripheral wireless communication device 204 can "write" at appropriate time periods, with the appropriate time periods time synchronized at both the central wireless communication device 202 and the peripheral wireless communication device 204, thereby enabling both the central wireless communication device 202 and the peripheral wireless communication device 204 to operate in a power efficient manner. In an embodiment, the central wireless communication device 202 is a tablet computing device including a display capability (e.g., an iPad®), and the peripheral wireless communication device 204 is an input device, e.g., a stylus, that can provide a stimulus, at regular time intervals, that can be sensed by the tablet computing device. In an embodiment, the stylus emits a stimulus signal at regular time intervals, e.g., every X milliseconds, and the tablet computing device uses the time synchronization methods described herein to align the stimulus signal of the stylus with a scan/read/sense/pickup time period for the tablet computing device. By providing a time synchronization of stimulus signal generation by the peripheral wireless communication device 204 (e.g., a stylus) and scan/read/sense/pickup time period for the central wireless communication device 202, the two devices can conserve limited battery power by only "writing" (stimulating) and "reading" (scanning) when required. The central wireless communication device 202 can provide time synchronization information to the peripheral wireless communication device 204 so that stimulus signals of the peripheral wireless communication device 204 can be aligned with scan time periods of the central wireless communication device 202.

FIG. 5C includes a set of representative signals at the central wireless communication device 202 and the peripheral wireless communication device 204 that illustrate timing for time synchronization of applications at the central wireless communication device 202 and the peripheral wireless communication device 204. As described above, an application at the central wireless communication device 202 and another parallel application at the peripheral wireless communication device 204 can generate signals that can be "time synchronized" to each other using methods and/or apparatus described herein. In an embodiment, the App Signal 552 at the central wireless communication device 202 can represent a "read" and/or "sense" and/or "obtain information" and/or "scan" signal, while the App Signal 542 at the peripheral wireless communication device 204 can represent a "write" and/or "stimulate" and/or "provide information" signal. As illustrated in FIG. 5C, the "read" time period of the App Signal 522 at the central wireless communication device 202 can extend over a time period that is wider or narrower than the "write" time period of the App Signal 542 at the peripheral wireless communication device 204. With application level time synchronization between the central wireless communication device 202 and the peripheral wireless communication device 204, the "Read" App Signal 552 can be aligned with the "Write" App Signal 542. In an embodiment, the host/application processor 306 of the central wireless communication device 202 can provide an interrupt (e.g., "App Proc Interrupt" 554) to the WPAN circuitry 304 in advance of and/or at the same time as the "Read" App Signal 552 is enabled. The App Proc Interrupt 554 can cause the WPAN circuitry 304 to capture a value CLKss of the piconet clock of the WPAN circuitry 304 (e.g., as indicated by the WPAN Clock 556 capture signal). In some embodiments, the value CLKss of the piconet clock of the WPAN circuitry 304 is adjusted by the central wireless communication device 202 to compensate for processing delay to interrupt, wake up, and/or due to other WPAN activity at the central wireless communication device 202. The (adjusted) CLKss value can be provided by the WPAN circuitry 304 of the central wireless communication device 202 to the WPAN circuitry 312 of the peripheral wireless communication device 204, by using a regularly scheduled periodic transmission and/or using an aperiodic, "on demand" communication over the WPAN connection 550. In some embodiments, communication between the central wireless communication device 202 and the peripheral wireless communication device 204 over the WPAN connection 550 can be regularly scheduled with a particular value for a time period $t_{BT}$ between communications. In an embodiment, the clock value CLKss of the piconet clock is communicated during a subsequent occurrence of a communication event on the WPAN connection 550, e.g., as part of a payload of a link layer Sync Indication message 514. When the WPAN circuitry 312 of the peripheral wireless communication device 204 receives the link layer Sync Indication message 514 correctly (or an equivalent message that provides the correct CLKss piconet clock value), the WPAN circuitry 312 of the peripheral wireless communication device 204 captures a current value CLKcc of the piconet clock of the WPAN circuitry 312 at the peripheral wireless communication device 204, e.g., as indicated by the WPAN Clock 546 capture signal. In some embodiments, the value CLKcc of the piconet clock captured by the peripheral wireless communication device 204 is adjusted by the peripheral wireless communication device 204 to compensate for processing delay to interrupt, wake up, and/or due to other WPAN activity at the peripheral wireless communication device 204. The peripheral wireless communication device 204 can calculate a time difference between the current piconet clock time value CLKcc as captured (and as optionally adjusted) at the peripheral wireless communication device 204 and the captured and adjusted clock time value CLKss provided by the central wireless communication device 202, e.g., in the link layer Sync Indication message 514. In an embodiment, the time difference calculation can be performed by the WPAN circuitry 312 of the peripheral wireless communication device 204. In an embodiment, the time difference is determined as (CLKcc-CLKss). The time difference can be provided by the WPAN circuitry 312 to the host/application processor 318 of the peripheral wireless communication device 204, e.g., by asserting an interrupt, indicated as App Proc Interrupt 544 in FIG. 5C. The time difference can be provided in a vendor specific command provided from the WPAN circuitry 312 to the host/application processor 318 as a time offset value, e.g., an integer number that can be interpreted as a number of time units, such as microseconds. The host/application processor 318 of the peripheral wireless communication device 204 can use the time difference information provided by the WPAN circuitry 312 to adjust time periods when specific events at the peripheral wireless communication device 204 occur, e.g., an App Signal 542 can be asserted to "write" a value during appropriate time instants so that the "Write" App Signal 542 at the peripheral wireless communication device 204 can align with the "Read" App Signal 552 on the central wireless communication device 202.

Figure 5D:
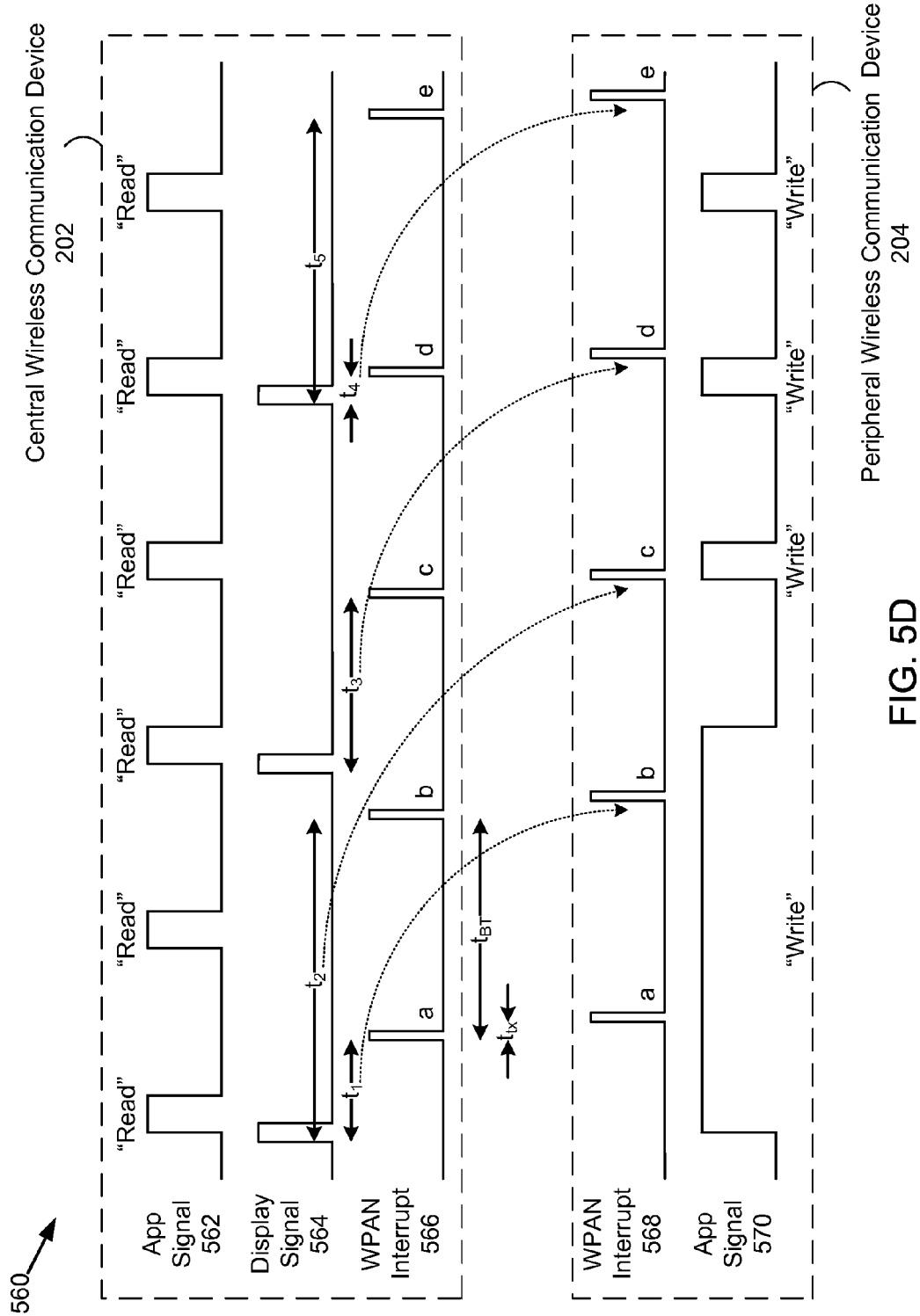
FIG. 5D illustrates another representative set of internal signals that can be used to coordinate time synchronization of events between a central wireless communication device and a peripheral wireless communication device in accordance with some embodiments.

FIG. 5D illustrates a diagram 560 of another representative set of internal signals that can be used to coordinate time synchronization of events between a central wireless communication device 202 and a peripheral wireless communication device 204, in accordance with some embodiments. As in FIGS. 5A to 5C, the central wireless communication device 202 is connected through a WPAN connection 550 to the peripheral wireless communication device 204, the WPAN connection 550 providing a relatively time synchronized channel, i.e., information about clock time values, e.g., a Bluetooth clock, can be provided between the central wireless communication device 202 and the peripheral wireless communication device 204 to align piconet clocks in the WPAN circuitry 304/312 of the respective wireless communication devices 202/204. It can be desired to synchronize an application running on the central wireless communication device 202 to another application running on the peripheral wireless communication device 204 by providing additional time synchronization information between the central wireless communication device 202 and the peripheral wireless communication device 204. In an embodiment, the central wireless communication device 202 can seek to "read" information provided by the peripheral wireless communication device 204. Rather than having the central wireless communication device 202 attempt to read the information from the peripheral wireless communication device 204 continuously, the central wireless communication device 202 can instead read information time synchronized with when information is "written" at the peripheral wireless communication device 204. Similarly, the peripheral wireless communication device 204 can "write" information to be "read" by the central wireless communication device 202 at discrete time intervals, which in some embodiments can be periodic, rather than writing continuously. As indicated in FIG. 5D, applications on the central and peripheral wireless communication devices 202/204 can be not synchronized to each other initially, and the application on the peripheral wireless communication device 204 can provide a continuous "write" App Signal 570 for a period of time, thereby permitting the central wireless communication device 202 to "read" using its own App Signal 562 at any time. To conserve power at the peripheral wireless communication device, however, it can be preferred to enable the "write" App Signal 570 only during time periods when the central wireless communication device 202 will enable its own "read" App Signal 562. To synchronize the two applications, time synchronization information can be provided to the peripheral wireless communication device 204 by the central wireless communication device 202, e.g., through a WPAN communication link as described herein. Once synchronization is achieved, the peripheral wireless communication device 204 can enter a power reduced state between "Write" cycles for the App Signal 570, thereby conserving its local power, such as for a limited capacity battery of the peripheral wireless communication device 204. In some embodiments, the peripheral wireless communication device 204 can enter a prolonged power reduced state, e.g., based on an inactivity timer expiration, and upon waking from the prolonged power reduced state, synchronization of the central wireless communication device 202 with the peripheral wireless communication device 204 can be reacquired to provide for application level event timing synchronization as illustrated in FIG. 5D. In some embodiments, the peripheral wireless communication device 204 can awaken to resynchronize and reenter a dormant state to ensure that time synchronization for the application can be restarted whenever required by a user of an application that uses the peripheral wireless communication device 204 in conjunction with the central wireless communication device 204.

In an embodiment, the host/application processor 306 of the central wireless communication device 202 can provide a time counter that is reset based on a Display Signal 564 and a value of the time counter can be read based on a WPAN Interrupt 566, e.g., which can be provided by the WPAN circuitry 304 to the host/application processor 306. The time value that is read from the time counter can be provided by the central wireless communication device 202 to the peripheral wireless communication device 204, e.g., through a WPAN communication link between them. In an embodiment, each connection event of the WPAN communication link can include a time value. As illustrated in FIG. 5D, a first time value $t_1$ can correspond to a time interval initiated by the leading edge of the Display Signal 564 and ending at the leading edge of the WPAN Interrupt 566 labeled "a" of the central wireless communication device 202. The time value $t_1$ can be communicated by the central wireless communication device 202 during a WPAN connection event associated with WPAN Interrupts 566 and 568 labeled "b", i.e., captured time values can be processed (e.g., adjusted if required) by the host/application processor 306 of the central wireless communication device 202 and provided to the WPAN circuitry 304 of the central wireless communication device 202 to communicate through the WPAN communication link to the peripheral wireless communication device 204 during the next available connection event. Similarly, a time value $t_2$ can be captured that corresponds to a time between the leading edge of the Display Signal 564 and the leading edge of the next WPAN Interrupt 566 labeled "b" and communicated during a subsequent WPAN connection event associated with the WPAN Interrupts 566/568 labeled "c". As illustrated in FIG. 5D, a time period between "Read" events for the App Signal 562 on the central wireless communication device 202 and a time period between WPAN connection events, indicated as $t_{BT}$, can differ, i.e., need not be the same. Thus, while the Display Signal 564 can be aligned with the App Signal 562, the time periods $t_n$ (from a leading edge of the Display signal 564 to a leading edge of a subsequent WPAN interrupt 566) can vary. The WPAN circuitry 312 of the peripheral wireless communication device 204 can provide the time values $t_n$ to the host/application processor 318 of the peripheral wireless communication device 204, which can use the provided time values $t_n$ in conjunction with time information from the WPAN circuitry 312 to determine a "Write" time period for the App Signal 570 at the peripheral wireless communication device 204 that matches a "Read" time period for the App Signal 562 of the central wireless communication device 202. A counter that counts time values at the central wireless communication device 202 can be reset by the leading edge of the Display Signal 564, e.g., as shown in FIG. 5D, time periods $t_n$ are measured from the leading edge of a pulse of the most recent display signal 564 to a leading edge of a WPAN interrupt 566. Thus, as shown in FIG. 5D, times $t_1$ and $t_2$ correspond to time periods measured from the first pulse of Display Signal 564, time $t_3$ corresponds to a time period measured from the second pulse of Display Signal 564, and times $t_4$ and $t_5$ correspond to time periods measured from the third pulse of Display Signal 564.

FIG. 6 illustrates representative formats that can be used for messages communicated between the central wireless communication device 202 and the peripheral wireless communication device 204 to provide time synchronization, in accordance with some embodiments. A link layer Clock Indication message 506 can be formatted as a protocol data unit (PDU), e.g., "Clock Indication" PDU 600, and a link layer Sync Indication message 514 can also be formatted as a PDU, e.g., "Sync Indication" PDU 610, and each message can be sent from the central wireless communication device 202 to the peripheral wireless communication device 204, e.g., as shown in the message exchange sequences illustrated in FIGS. 5A and 5B. The Clock Indication PDU 600 can be sent from the central wireless communication device 202 to the peripheral wireless communication device 204 whenever the host/application processor 306 of the central wireless communication device 202 tags the communication link to the peripheral wireless communication device 204 as being "Sync Aware", e.g., as indicated in the "Sync Aware" message 504 (which can be vendor specific) shown in FIG. 5A. The Clock Indication PDU 600 can include a snapshot of the central wireless communication device's piconet clock at the start of a connection event. The peripheral wireless communication device 204 can adjust its own piconet clock based on the clock information provided in the Clock Indication PDU 600. By adjusting the piconet clock of the peripheral wireless communication device 204, both piconet clocks at either end of the communication link can be synchronized to the same time reference clock. The Clock Indication PDU 600 can include multiple fields of information. An OpCode field 602 can include a hexadecimal-based octet identifier to indicate the Clock Indication PDU 600. In an embodiment, the OpCode field 602 of the Clock Indication PDU 600 can use a proprietary or a standardized value, e.g., a representative value being "0xF2" as indicated in FIG. 6. The OpCode field 602 of the Clock Indication PDU 600 can be followed by a set of payload data fields that include specific clock information values associated with the central wireless communication device 202 that is sending the Clock Indication PDU 600. The Clock Indication PDU 600 can include an event counter value for when a real time clock value (i.e., the piconet clock value also included in the Clock Indication PDU 600) is captured. The event counter value can be referred to as a CLK Snap Instant 604 and can include two octets. The real time piconet clock value included in the Clock Indication PDU 600 can include 28 bits of the real time piconet clock or a subset of bits thereof. In an embodiment, the piconet clock value can include the 26 most significant bits of the real time piconet clock of the central wireless communication device 202. The 26 bits of the real time piconet clock value have a resolution of two time slot intervals corresponding to a resolution of 1.25 milliseconds. As the complete 28-bit real time piconet clock value can be captured at the beginning of a frame, the two least significant bits of the 28-bit real time piconet clock value can be zero and therefore need not be transmitted. The Clock Indication PDU 600 can end with a set of 6 bits reserved for future use (RFU) providing a total of 7 octets.

The central wireless communication device 202 can also send to the peripheral wireless communication device 204 a proprietary link layer Sync Indication PDU 610. The Sync Indication PDU 610 can be a control message that indicates a time value that specifies when a Sync Interrupt 512 is generated by the host/application processor 306 of the central wireless communication device 202. In some embodiments, the link layer Sync Indication PDU 610 is sent periodically by the central wireless communication device 202 to the peripheral wireless communication device 204. In some embodiments, the Sync Indication PDU 610 is sent when a Sync Interrupt 512 occurs. The host/application processor 306 of the central wireless communication device 202 can indicate a time period for sending the Sync Indication PDU 610 when tagging the BTLE connection to the peripheral wireless communication device 204 as "Sync Aware" and can enable a feature of the central wireless communication device 202 to send the Sync Indication PDU 610. The Sync Indication PDU 610 can include a one-octet OpCode field 612 that identifies the link layer PDU as a Sync Indication PDU 610. In an embodiment, the OpCode field 612 of the Sync Indication PDU 610 can use a proprietary or a standardized value, e.g., a representative hexadecimal value being "0xF3" as indicated in FIG. 6. The OpCode field 612 of the Sync Indication PDU 610 can be followed by a set of payload data including piconet clock information as well as a finer granularity time indication providing a time offset within a piconet clock time slot. The payload data of the Sync Indication PDU 610 can include an entire piconet clock value (28 bits) in a particular field, e.g., as indicated by CLK[27:0] field 616 in the Sync Indication PDU 610 of FIG. 6. The 28-bit piconet clock value can be accompanied by a Slot Offset field that indicates a time offset using a predetermined time unit within a "half slot" specified by the piconet clock value CLK[27:2] field 616. In an embodiment, the time offset indicated by the Slot Offset field 614 can indicate a time in micro-seconds within a half time slot (of 312 micro-seconds) at which the real time piconet clock of the central wireless communication device 202 was captured. In an embodiment, the Slot Offset field 614 can span a valid range of 0 to 312 microseconds. In some embodiments, the Slot Offset field 614 can span a range of values that ensure sufficient precision of time synchronization as required by one or more underlying applications that use the information for time synchronization. The Slot Offset field 614 can provide a time differential from an edge of a time slot specified by a separate clock counter, e.g., a time slot specified by a piconet clock. The host/application processor can provide a Sync Interrupt 512 to the WPAN circuitry 304 at an arbitrary time (i.e., not necessarily at a time slot, half time slot, or other WPAN clock edge boundary). The Sync Indication PDU 610 can include the entire piconet clock value (CLK[27:0] field 616) and the value in the Slot Offset field 614 to provide an accurate indication of when the piconet clock value is captured by the WPAN circuitry 304 of the central wireless communication device 202. In some embodiments, the WPAN circuitry 304 of the central wireless communication device 202 can adjust the value of the piconet clock indicated in the Sync Indication PDU 610 and/or adjust the value in the Slot Offset field 614 value to include any interrupt delay, processing delay, or to account for clock arithmetic, e.g., to account for rollover of an underlying counter.

Figure 7:
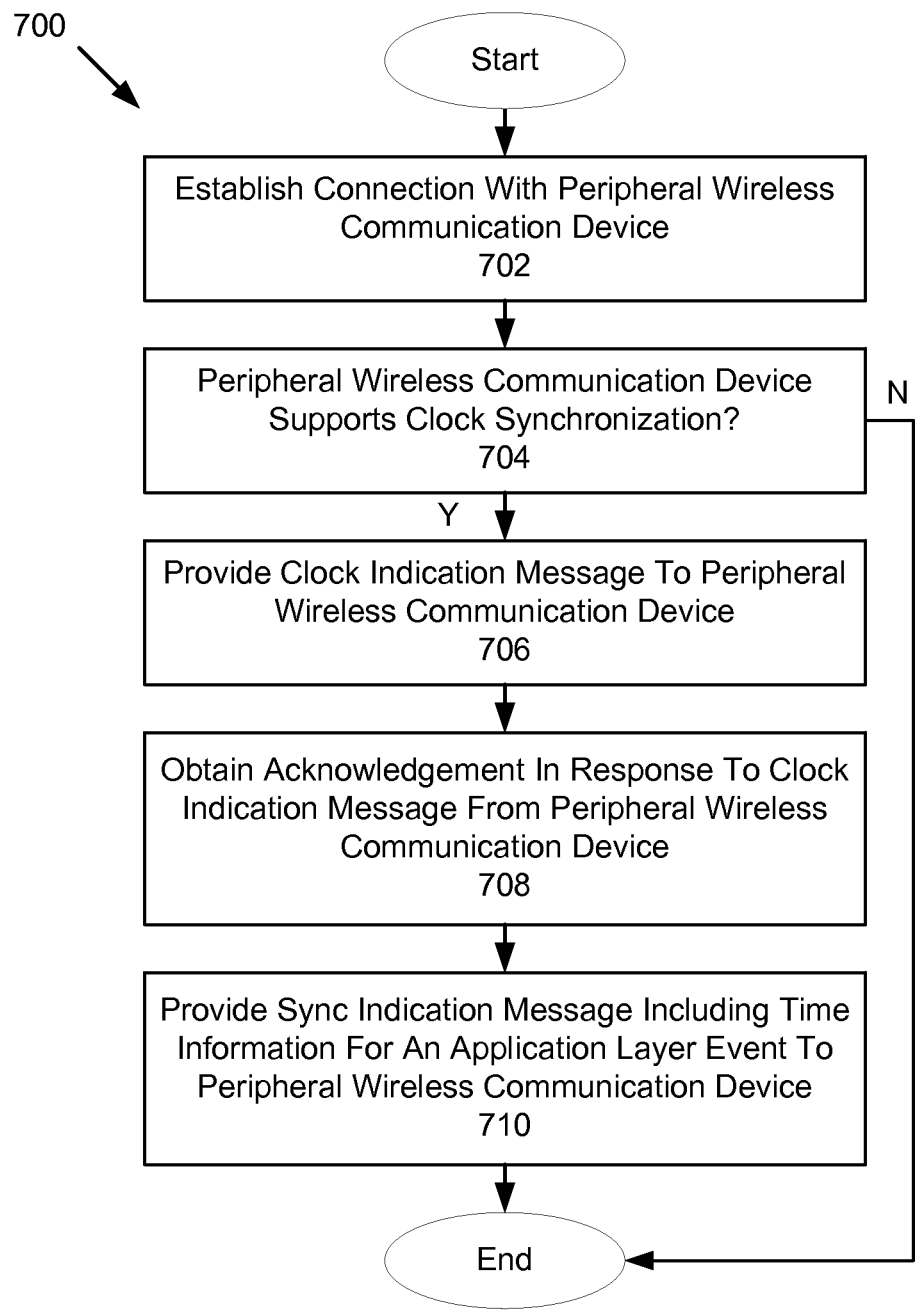
FIG. 7 illustrates a representative method for providing time synchronization over a connection between the central wireless communication device and the peripheral wireless communication device in accordance with some embodiments.

FIG. 7 illustrates a flowchart 700 of a representative method for providing time synchronization over a connection between the central wireless communication device 202 and the peripheral wireless communication device 204 in accordance with some embodiments. In step 702, the central wireless communication device 202 establishes a connection with the peripheral wireless communication device 204. In an embodiment, the connection established is a communication link operating in accordance with a WPAN communication protocol, e.g., a Bluetooth or Bluetooth Low Energy protocol. In step 704, the central wireless communication device 202 determines whether the peripheral wireless communication device 204 supports a clock synchronization feature. When the peripheral wireless communication device 204 does not support the clock synchronization feature, the method ends. When the peripheral wireless communication device 204 supports the clock synchronization feature, in step 706, the central wireless communication device 202 provides a clock indication message to the peripheral wireless communication device 204. In some embodiments, the clock indication message provided to the peripheral wireless communication device 204 corresponds to the Clock Indication message 506, e.g., as shown in FIGS. 5A and 5B. The clock indication message, in some embodiments, includes time clock information to synchronize a clock at the peripheral wireless communication device 204 to a clock at the central wireless communication device 202. In an embodiment, the clocks that are synchronized correspond to piconet clocks used by wireless circuitry of the wireless communication devices 202/204. In an embodiment, the clock indication message is formatted as a Clock Indication PDU 600, e.g., as shown in FIG. 6. The clock indication message includes a time value for the piconet clock of the central wireless communication device 202 and a time instant when the piconet clock time value is captured. In an embodiment, the time value for the piconet clock includes all or a portion of 28 bits of the piconet clock time value. In an embodiment, the time instant is formatted as two octets of information to capture a system level event time operating at a finer granularity than the piconet clock. In step 708, the central wireless communication device 202 obtains an acknowledgement from the peripheral wireless communication device 204 in response to the clock indication message sent. In some embodiments, the central wireless communication device 202 resends the clock indication message until receiving an acknowledgement or rejection from the peripheral wireless communication device 204 or when the communication link terminates. In some embodiments, retransmission of the clock indication message can repeat for a pre-determined resend number of times. In some embodiments, retransmission can be based on a resend timer. In some embodiments, acknowledgement from the peripheral wireless communication device 204 provides an indication that a clock, e.g., a piconet clock used by wireless circuitry of the peripheral wireless communication device 204, is "synchronized" to a corresponding clock, e.g., the piconet clock used by wireless circuitry of the central wireless communication device 202. In an embodiment, the acknowledgement indicates that the wireless circuitry of the peripheral wireless communication device 204 uses the same time base as the wireless circuitry of the central wireless communication device 202 (e.g., aligned according to the information provided in the Clock Indication PDU 600). In step 710, the central wireless communication device 202 provides a link layer synchronization indication (Sync Indication) message (e.g., a Sync Indication message 514 as shown in FIGS. 5A and 5B, and/or a Sync Indication PDU 610 as formatted and shown in FIG. 6) to the peripheral wireless communication device 204. The central wireless communication device 202 can send the link layer sync indication message to the peripheral wireless communication device 204 in response to occurrence of an event at the central wireless communication device 202. In an embodiment, an application layer event 510 at the central wireless communication device 202 can result in a host/application processor 306 generating an interrupt (e.g., a Sync Interrupt 512 as indicated in FIG. 5A) to the WPAN circuitry 304 of the central wireless communication device 202. The WPAN circuitry 304 of the central wireless communication device 202 can in turn capture a time value of the piconet clock of the central wireless communication device 202 when the interrupt occurs. The WPAN circuitry 304 can include the piconet clock time value in the Sync Indication message sent to the peripheral wireless communication device 204. The WPAN circuitry 304 of the central wireless communication device 202 can also provide a time offset value in the Sync Indication message sent to the peripheral wireless communication device 204. In an embodiment, the time offset included in the Sync Indication PDU 610 indicates a time offset, e.g., in micro seconds, at which the piconet clock time value is captured, the time offset referenced from the start of a half time slot interval of the piconet clock of the central wireless communication device 202. In an embodiment, the time instant is formatted as an integer value ranging from zero, (an offset of zero corresponding to an edge of the half time slot), to a maximum value, e.g., 312, that can correspond to an opposite edge of the half time slot. In other embodiments, the range of values for the time instant can provide a granularity that indicates the capture time of the piconet clock as required by an underlying application. In an embodiment, the range of values can range from zero to a maximum number that evenly divides a time period associated with the piconet clock in subintervals of a pre-determined value of time units, e.g., micro seconds. In some embodiments, Sync Indication messages are sent for each application layer event received. In some embodiments, a Sync Indication timer is started after sending a first Sync Indication message, and interrupts received that correspond to application layer events are ignored until the Sync Indication timer expires, following the expiration of which, the next received interrupt corresponding to an application layer event can generate a following Sync Indication message. In some embodiments, application layer events at the central wireless communication device 202 can occur on a non-periodic basis, and each application layer event can generate an interrupt, e.g., from the host/application processor 306 to the WPAN circuitry 304, which can in turn send a Sync Indication message as a result. In some embodiments, application layer events can occur periodically, and a time period between application layer events can be known by one or more processors and circuitry in the central wireless communication device 202 and/or the peripheral wireless communication device 204. In an embodiment, the Sync Indication message can be sent periodically and can include time information to re-align a piconet clock and/or a timing of system/application level events at the peripheral wireless communication device 204.

Representative applications of systems, methods, apparatuses, and computer program products according to the present disclosure are described in this section hereinabove. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the detailed description provided, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Software, hardware, or a combination of hardware and software can implement various aspects of the described embodiments. The described embodiments can also be encoded as computer program code on a non-transitory computer readable medium. The non-transitory computer readable medium is any data storage device that can store data that can thereafter be read by a computer system. Examples of the non-transitory computer readable medium include read-only memory, random-access memory, CD-ROMs, DVDs, magnetic tape and optical data storage devices. The computer program code can also be distributed over network-coupled computer systems so that the computer program code is stored and executed in a distributed fashion.

The various aspects, embodiments, implementations or features of the described embodiments can be used separately or in any combination. The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

The advantages of the embodiments described are numerous. Different aspects, embodiments or implementations can yield one or more of the following advantages. Many features and advantages of the present embodiments are apparent from the written description and, thus, it is intended by the appended claims to cover all such features and advantages of the invention. Further, since numerous modifications and changes will readily occur to those skilled in the art, the embodiments should not be limited to the exact construction and operation as illustrated and described. Hence, all suitable modifications and equivalents can be resorted to as falling within the scope of the invention.

What is claimed is:

1. A method for providing time synchronization over a low power connection between a central wireless communication device and a peripheral wireless communication device, the method comprising:
at the central wireless communication device:
establishing a connection to the peripheral wireless communication device;
obtaining an indication that the peripheral wireless communication device supports time synchronization;
providing a clock indication message to the peripheral wireless communication device, the clock indication message including a first clock value for a clock associated with wireless circuitry of the central wireless communication device;
obtaining an acknowledgement of the clock indication message from the peripheral wireless communication device; and
in response to an application layer event at the central wireless communication device, providing a sync indication message to the peripheral wireless communication device, the sync indication message including a second clock value for the clock associated with the wireless circuitry of the central wireless communication device based on the application layer event and a time offset value for a time offset within a time period specified by the second clock value,
wherein the time offset value provides an indication for a time position within the time period at a time granularity that is finer than provided by the clock values for the clock associated with the wireless circuitry.

2. The method as recited in claim 1, wherein the low power connection comprises a low power mode for a wireless personal area network (WPAN) connection.

3. The method as recited in claim 2, wherein the WPAN connection is a Bluetooth Low Energy (BTLE) connection.

4. The method as recited in claim 1, wherein the second clock value included in the sync indication message provides an indication when an interrupt associated with the application layer event occurred at the central wireless communication device.

5. The method as recited in claim 1, wherein the application layer event is one of a plurality of application layer events that occur at a periodic rate for an application running at the central wireless communication device, the method further comprising:
determining a time synchronization rate sufficient to ensure proper time synchronization between the application running at the central wireless communication device and one or more corresponding applications at the peripheral wireless communication device; and
sending sync indication messages to the peripheral wireless communication device at least at the time synchronization rate.

6. The method as recited in claim 5, wherein the time synchronization rate is less than the periodic rate at which application layer events occur for the application running at the central wireless communication device.

7. The method of claim 1, wherein the first and second clock values are associated with a Bluetooth Low Energy (BTLE) clock for the wireless connection.

8. The method of claim 7, wherein the time offset value is based on a system level clock that operates at a higher clock rate than the BTLE clock.

9. A central wireless communication device configurable to provide time synchronization over a wireless connection to a peripheral wireless communication device, the central wireless communication device comprising:
an application processor configurable to provide time synchronization information to an application processor in the peripheral wireless communication device by:
providing an indication to wireless circuitry in the central wireless communication device that the peripheral wireless communication device supports time synchronization for an application, and
providing an indication of an application layer event occurrence for the application; and
the wireless circuitry configurable to communicate with a plurality of peripheral wireless communication devices including the peripheral wireless communication device in accordance with a low power wireless communication protocol by:
establishing the wireless connection to the peripheral wireless communication device,
obtaining the indication that the peripheral wireless communication device supports time synchronization for the application,
providing a clock indication message to the peripheral wireless communication device, the clock indication message including a first clock value for a clock associated with wireless circuitry, and
in response to receipt of the indication of the application layer event occurrence, providing a sync indication message to the peripheral wireless communication device, the sync indication message including timing information comprising:
a second clock value for the clock associated with the wireless circuitry of the central wireless communication device based on the application layer event occurrence, and
a time offset value for a time offset within a time period specified by the second clock value,
wherein the offset value provides an indication for a time position with the time period at a time granularity that is finer than provided by the clock values for the clock associated with the wireless circuitry.

10. The central wireless communication device as recited in claim 9, wherein the low power wireless communication protocol is a Bluetooth Low Energy (BTLE) wireless communication protocol, the first clock value and the second clock value are associated with a BTLE clock for the wireless connection, and the time offset value is based on a system level clock that operates at a higher clock rate than the BTLE clock.

11. The central wireless communication device as recited in claim 9, wherein the application processor is further configurable to:
adjust one or more of: the first clock value, the second clock value, and the time offset value based on one or more of: an interrupt delay time period of the application processor or the wireless circuitry and processing delays of the application processor or the wireless circuitry.

12. The central wireless communication device as recited in claim 9, wherein the wireless circuitry is further configured to provide the sync indication message to the peripheral wireless communication device as a protocol data unit (PDU) and to retransmit the PDU until an acknowledgement (ACK) is received from the peripheral wireless communication device or a timer expires.

13. The central wireless communication device of claim 9, wherein the second clock value included in the sync indication message provides an indication when an interrupt associated with the application layer event occurred.

14. A peripheral wireless communication device configurable to time synchronize an application over a wireless connection to a central wireless communication device, the peripheral wireless communication device comprising:

an application processor configurable to obtain time synchronization information from an application processor in the central wireless communication device by:
in response to receiving a sync trigger message from wireless circuitry in the peripheral wireless communication device, determining a time value for an event associated with the application based on information included in the sync trigger message; and
the wireless circuitry configurable to communicate with the central wireless communication device in accordance with a low power wireless communication protocol by:
establishing the wireless connection to the central wireless communication device,
providing an indication to the central wireless communication device that the peripheral wireless communication device supports time synchronization for the application,
obtaining a sync indication message from the central wireless communication device, the sync indication message including timing information based on an application layer event occurrence for a corresponding application at the central wireless communication device and at a time granularity that is finer than clock values for a clock associated with the wireless connection; and
providing the sync trigger message to the application processor, the sync trigger message including information based on the timing information included in the sync indication message,
wherein one or more of the application processor and the wireless circuitry are configurable to enter a power reduced state between application layer events after application layer event synchronization is acquired.

15. The peripheral wireless communication device as recited in claim 14, wherein the timing information included in the sync indication message comprises a clock value for the clock associated with the wireless connection and a time offset value for a time offset within a time period specified by the clock value.

16. The peripheral wireless communication device as recited in claim 14, wherein the information in the sync trigger message comprises a calculated time for an interrupt generated at the central wireless communication device for a corresponding event associated with the application.

17. The peripheral wireless communication device as recited in claim 14, wherein the application processor is further configured to determine the time value for the event associated with the application based on when the sync trigger message occurs.

18. The peripheral wireless communication device as recited in claim 14, wherein the event associated with the application is one of a plurality of application layer events that occur at a periodic rate for the application running at the central wireless communication device, and the application processor of the peripheral wireless communication device is configurable to synchronize application layer events for one or more corresponding applications running at the peripheral wireless communication device to the application running at the central wireless communication device based on information included in the sync trigger message.

19. The peripheral wireless communication device as recited in claim 14, wherein the application processor is configurable to power down all or a portion of wireless circuitry and processing circuitry of the peripheral wireless communication device between application layer events after application layer synchronization is acquired.

\* \* \* \* \*